US010609679B2

(12) United States Patent
Jiang et al.

(10) Patent No.: US 10,609,679 B2
(45) Date of Patent: Mar. 31, 2020

(54) PROTOCOL FOR DEVICE-TO-DEVICE POSITIONING

(71) Applicant: QUALCOMM Incorporated, San Diego, CA (US)

(72) Inventors: Libin Jiang, Bridgewater, NJ (US); Shailesh Patil, Raritan, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 14/811,407

(22) Filed: Jul. 28, 2015

(65) Prior Publication Data

US 2017/0034804 A1 Feb. 2, 2017

(51) Int. Cl.
| | | |
|---|---|---|
| *H04W 72/00* | (2009.01) | |
| *H04W 72/04* | (2009.01) | |
| *H04L 5/00* | (2006.01) | |
| *H04W 8/00* | (2009.01) | |
| *H04W 64/00* | (2009.01) | |
| *H04W 76/14* | (2018.01) | |

(52) U.S. Cl.
CPC ......... *H04W 72/005* (2013.01); *H04L 5/0094* (2013.01); *H04W 8/005* (2013.01); *H04W 72/044* (2013.01); *H04W 64/00* (2013.01); *H04W 76/14* (2018.02)

(58) Field of Classification Search
None
See application file for complete search history.

(56) References Cited

U.S. PATENT DOCUMENTS

| 6,122,131 A | * | 9/2000 | Jeppson | G11B 5/012 |
| | | | | 360/313 |
| 9,439,039 B1 | * | 9/2016 | Patil | H04W 4/023 |
| 9,913,233 B2 | * | 3/2018 | Abedini | H04W 56/0015 |
| 2002/0069162 A1 | * | 6/2002 | Boylan | G06Q 20/10 |
| | | | | 705/39 |
| 2003/0063598 A1 | * | 4/2003 | Huo | H04W 72/042 |
| | | | | 370/349 |
| 2003/0193969 A1 | * | 10/2003 | Pecen | H04W 36/0088 |
| | | | | 370/509 |
| 2006/0089154 A1 | * | 4/2006 | Laroia | F01D 9/023 |
| | | | | 455/456.2 |
| 2010/0020905 A1 | * | 1/2010 | Mansour | H04J 11/00 |
| | | | | 375/343 |
| 2010/0074344 A1 | * | 3/2010 | Wang | H04L 5/0048 |
| | | | | 375/259 |

(Continued)

OTHER PUBLICATIONS

"International Search Report and Written Opinion—PCT/US2016/038755—ISA/EPO—dated Nov. 15, 2016".

*Primary Examiner* — Christopher T Wyllie
(74) *Attorney, Agent, or Firm* — Arent Fox LLP

(57) ABSTRACT

A method, an apparatus, and a computer program product for wireless communication are provided. The apparatus determines a position of the apparatus. The apparatus broadcasts information in a first subset of a set of resources. The information includes the position of the apparatus, a sequence ID, and a resource ID associated with a second subset of the set of resources. The apparatus broadcasts a sequence in at least one symbol of the second subset of the set of resources. The at least one symbol is identified by the resource ID and the sequence is identified by the sequence ID.

28 Claims, 18 Drawing Sheets

(56) References Cited

U.S. PATENT DOCUMENTS

| | | | |
|---|---|---|---|
| 2010/0278137 A1* | 11/2010 | Kwon | H04J 13/0059 370/330 |
| 2011/0032885 A1* | 2/2011 | Wang | H04W 72/0486 370/329 |
| 2011/0143746 A1* | 6/2011 | Lehser | H04W 24/02 455/423 |
| 2012/0250636 A1* | 10/2012 | Wang | H04W 72/08 370/329 |
| 2013/0156125 A1* | 6/2013 | Ko | H04B 7/0478 375/267 |
| 2013/0156190 A1* | 6/2013 | Selen | H04W 4/06 380/270 |
| 2014/0057667 A1* | 2/2014 | Blankenship | H04L 67/303 455/500 |
| 2014/0075181 A1* | 3/2014 | Raghupathy | H04L 63/0442 713/150 |
| 2014/0235238 A1* | 8/2014 | Pais | H04W 8/005 455/434 |
| 2014/0313908 A1* | 10/2014 | da Silva | H04W 4/70 370/252 |
| 2014/0328329 A1* | 11/2014 | Novlan | H04W 72/042 370/336 |
| 2014/0341176 A1* | 11/2014 | Chu | H04W 8/005 370/330 |
| 2014/0349659 A1* | 11/2014 | Ishii | H04W 76/10 455/444 |
| 2015/0003263 A1* | 1/2015 | Senarath | H04L 5/0051 370/252 |
| 2015/0017993 A1* | 1/2015 | Ishii | H04W 36/0011 455/444 |
| 2015/0018017 A1* | 1/2015 | Jang | H04W 76/14 455/456.5 |
| 2015/0023267 A1* | 1/2015 | Lim | H04L 1/1854 370/329 |
| 2015/0078466 A1* | 3/2015 | Zhou | H04W 56/004 375/260 |
| 2015/0103933 A1* | 4/2015 | Nagata | H04B 7/0456 375/260 |
| 2015/0319724 A1* | 11/2015 | Chae | H04W 8/005 370/315 |
| 2015/0351076 A1* | 12/2015 | Pais | H04W 76/14 370/312 |
| 2016/0302143 A1* | 10/2016 | Karlsson | H04W 48/20 |
| 2016/0360393 A1* | 12/2016 | Wu | H04W 8/005 |
| 2017/0026100 A1* | 1/2017 | Wang | H04W 72/12 |
| 2017/0034800 A1* | 2/2017 | Abedini | H04W 56/0015 |
| 2017/0034804 A1* | 2/2017 | Jiang | H04W 72/005 |

\* cited by examiner

PROTOCOL FOR DEVICE-TO-DEVICE POSITIONING

BACKGROUND

Field

The present disclosure relates generally to communication systems, and more particularly, to a protocol (e.g., media access control (MAC) protocol) for device-to-device (D2D) positioning in a wireless network.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a user equipment (UE). The apparatus may determine a position of the apparatus. The apparatus may broadcast information in a first subset of a set of resources. The information may include the position of the apparatus, a sequence identifier (ID), and a resource ID associated with a second subset of the set of resources. The apparatus may broadcast a sequence in at least one symbol of the second subset of the set of resources, the at least one symbol being identified by the resource ID and the sequence being identified by the sequence ID.

In another aspect, the apparatus includes means for determining a position of the apparatus. The apparatus includes means for broadcasting information in a first subset of a set of resources, the information comprising the position of the UE, a sequence identifier (ID), and a resource ID associated with a second subset of the set of resources. The apparatus includes means for broadcasting a sequence in at least one symbol of the second subset of the set of resources, the at least one symbol being identified by the resource ID and the sequence being identified by the sequence ID. In an aspect, the sequence is a Zadoff Chu sequence, and the sequence ID comprises a root index and a cyclic shift associated with the Zadoff Chu sequence. In another aspect, the sequence occupies an entire bandwidth of the at least one symbol. In one configuration, the apparatus includes means for receiving a message from a base station that indicates the first subset of the set of resources, the second subset of the set of resources, and a third subset of the set of resources. In another configuration, the apparatus includes means for determining at least one resource for broadcasting the information in the first subset of the set of resources. In another configuration, the apparatus includes means for determining the at least one symbol of the second subset of the set of resources for broadcasting the sequence. In an aspect, the determination is based on a random selection or an energy-based detection. In another configuration, the apparatus includes means for receiving a message from a base station that indicates the at least one symbol of the second subset of the set of resources for transmitting the sequence, wherein the determination of the at least one symbol is based on the received message.

In another aspect, a computer-readable medium associated with a UE and storing computer executable code for wireless communication is provided. The computer-readable medium comprising code for determining a position of the UE, broadcasting information in a first subset of a set of resources, the information comprising the position of the UE, a sequence identifier (ID), and a resource ID associated with a second subset of the set of resources, and broadcasting a sequence in at least one symbol of the second subset of the set of resources, the at least one symbol being identified by the resource ID and the sequence being identified by the sequence ID. In an aspect, the sequence is a Zadoff Chu sequence, and the sequence ID comprises a root index and a cyclic shift associated with the Zadoff Chu sequence. In another aspect, the sequence occupies an entire bandwidth of the at least one symbol. In one configuration, the computer-readable medium further comprises code for receiving a message from a base station that indicates the first subset of the set of resources, the second subset of the set of resources, and a third subset of the set of resources. In another configuration, the computer-readable medium further comprises code for determining at least one resource for broadcasting the information in the first subset of the set of resources. In another configuration, the computer-readable medium further comprises code for determining the at least one symbol of the second subset of the set of resources for broadcasting the sequence. In an aspect, the determination is based on a random selection or an energy-based detection. In another configuration, the computer-readable medium further comprises code for receiving a message from a base station that indicates the at least one symbol of the second subset of the set of resources for transmitting the sequence, wherein the determination of the at least one symbol is based on the received message.

In another aspect of the disclosure, a method, a computer-readable medium, and an apparatus are provided. The apparatus may be a UE. The apparatus may receive a first set of information in a first subset of a set of resources from a plurality of UEs. The first set of information may include, for each UE in the plurality of UEs, a position of said each UE, a sequence ID, and a resource ID. The apparatus may receive a set of sequences in symbols of a second subset of the set of resources from the plurality of UEs. Each sequence in the set of sequences may be associated with the respective sequence ID and may be received on at least one symbol of the symbols. The at least one symbol may be identified by the respective resource ID. The apparatus may determine timing information associated with the received set of sequences. The apparatus may broadcast a second set of information in a third subset of the set of resources. The second set of information may include the determined timing information, a position associated with the apparatus, and identifiers of the plurality of UEs.

In another aspect, the apparatus may include means for receiving a first set of information in a first subset of a set of resources from a plurality of UEs. The first set of information comprising, for each UE in the plurality of UEs, a position of said each UE, a sequence identifier (ID), and a resource ID. The apparatus may include means for receiving a set of sequences in symbols of a second subset of the set of resources from the plurality of UEs, wherein each sequence in the set of sequences is associated with the respective sequence ID and is received on at least one symbol of the symbols, the at least one symbol being identified by the respective resource ID. The apparatus may include means for determining timing information associated with the received set of sequences. The apparatus may include means for broadcasting a second set of information in a third subset of the set of resources, the second set of information comprising the determined timing information, a position associated with the UE, and identifiers of the plurality of UEs. In an aspect, the set of sequences include Zadoff Chu sequences, and the respective sequence ID comprises a root index and a cyclic shift associated with a Zadoff Chu sequence. In another aspect, each sequence of the set of sequences occupies an entire bandwidth of the at least one symbol. In one configuration, the apparatus includes means for receiving a message from a base station that indicates the first, second, and third subsets of the set of resources. In another configuration, the apparatus includes means for determining at least one resource for broadcasting the second set of information in the third subset of the set of resources. In an aspect, the determination is based on a random selection or an energy-based detection. In another configuration, the apparatus includes means for receiving a message from a base station that indicates the at least one resource for broadcasting the second set of information, wherein the determination of the at least one resource is based on the received message.

In another aspect, a computer-readable medium associated with a UE and storing computer executable code for wireless communication is provided. The computer-readable medium comprises code for receiving a first set of information in a first subset of a set of resources from a plurality of UEs, the first set of information comprising, for each UE in the plurality of UEs, a position of said each UE, a sequence identifier (ID), and a resource ID. The computer-readable medium comprises code for receiving a set of sequences in symbols of a second subset of the set of resources from the plurality of UEs, wherein each sequence in the set of sequences is associated with the respective sequence ID and is received on at least one symbol of the symbols, the at least one symbol being identified by the respective resource ID. The computer-readable medium comprises code for determining timing information associated with the received set of sequences. The computer-readable medium comprises code for broadcasting a second set of information in a third subset of the set of resources, the second set of information comprising the determined timing information, a position associated with the UE, and identifiers of the plurality of UEs. In an aspect, the set of sequences include Zadoff Chu sequences, and the respective sequence ID comprises a root index and a cyclic shift associated with a Zadoff Chu sequence. In another aspect, each sequence of the set of sequences occupies an entire bandwidth of the at least one symbol. In another configuration, the computer-readable medium further comprises code for receiving a message from a base station that indicates the first, second, and third subsets of the set of resources. In another configuration, the computer-readable medium further comprises code for determining at least one resource for broadcasting the second set of information in the third subset of the set of resources. In an aspect, the determination is based on a random selection or an energy-based detection. In another configuration, the computer-readable medium further comprises code for receiving a message from a base station that indicates the at least one resource for broadcasting the second set of information, wherein the determination of the at least one resource is based on the received message.

In another aspect of the disclosure, a method, a computer-readable medium, and an apparatus are provided. A method of wireless communication by UE comprises receiving a first set of information in a first subset of a set of resources from a first plurality of UEs, the first set of information comprising identifiers associated with each UE of the first plurality of UEs and further comprising, for said each UE in the first plurality of UEs, a position of said each UE, a sequence identifier (ID), and a resource ID. The method comprises receiving a first set of sequences in a second subset of the set of resources from the first plurality of UEs, wherein each sequence in the first set of sequences is associated with the respective sequence ID and is received on at least one symbol identified by the respective resource ID. The method comprises receiving a second set of information in a third subset of the set of resources from a second plurality of UEs, the second set of information comprising a position of each UE in the second plurality of UEs, a first set of timing information associated with a second set of sequences, and identifiers of UEs associated with the second set of sequences, wherein the identifiers of the UEs associated with the second set of sequences and the identifiers associated with said each UE of the first plurality of UEs have identifiers in common. The method comprises determining a position of the UE based on the received first set of information, the received first set of sequences, and the received second set of information. In an aspect, the first set of sequences includes Zadoff Chu sequences, and each of the sequence IDs comprises a root index and a cyclic shift associated with a Zadoff Chu sequence. In another aspect, each sequence of the first set of sequences occupies an entire bandwidth of the at least one symbol. In one configuration, the method further comprises receiving a message from a base station that indicates the first subset of the set of resources, the second subset of the set of resources, and the third subset of the set of resources. In an aspect, the first subset of the set of resources, the second subset of the set of resources, and the third subset of the set of resources occur periodically. In another configuration, the determining the position of the UE comprises determining a second set of timing information based on the received first set of sequences and determining the position of the UE based on a first subset of the first set of timing information and a second subset of the second set of timing information.

In another aspect, in which the apparatus is provided, the apparatus may be a UE. The apparatus may include mean for receiving a first set of information in a first subset of a set of resources from a first plurality of UEs, the first set of information comprising identifiers associated with each UE of the first plurality of UEs and further comprising, for said each UE in the first plurality of UEs, a position of said each UE, a sequence identifier (ID), and a resource ID. The apparatus may include mean for receiving a first set of sequences in a second subset of the set of resources from the first plurality of UEs, wherein each sequence in the first set of sequences is associated with the respective sequence ID and is received on at least one symbol identified by the respective resource ID. The apparatus may include mean for receiving a second set of information in a third subset of the set of resources from a second plurality of UEs, the second set of information comprising a position of each UE in the second plurality of UEs, a first set of timing information associated with a second set of sequences, and identifiers of UEs associated with the second set of sequences, wherein the identifiers of the UEs associated with the second set of sequences and the identifiers associated with said each UE of the first plurality of UEs have identifiers in common. The apparatus may include mean for determining a position of the UE based on the received first set of information, the received first set of sequences, and the received second set of information. In an aspect, the first set of sequences includes Zadoff Chu sequences, and each of the sequence IDs comprises a root index and a cyclic shift associated with a Zadoff Chu sequence. In another aspect, each sequence of the first set of sequences occupies an entire bandwidth of the at least one symbol. In one configuration, the apparatus may include mean for receiving a message from a base station that indicates the first subset of the set of resources, the second subset of the set of resources, and the third subset of the set of resources. In an aspect, the first subset of the set of resources, the second subset of the set of resources, and the third subset of the set of resources occur periodically. In another configuration, the means for determining the position of the UE may be configured to determine a second set of timing information based on the received first set of sequences and to determine the position of the UE based on a first subset of the first set of timing information and a second subset of the second set of timing information.

In another aspect, in which the apparatus is provided, the apparatus may be a UE. The apparatus may include a memory and at least one processor coupled to the memory. The at least one processor may be configured to receive a first set of information in a first subset of a set of resources from a first plurality of UEs, the first set of information comprising identifiers associated with each UE of the first plurality of UEs and further comprising, for said each UE in the first plurality of UEs, a position of said each UE, a sequence identifier (ID), and a resource ID. The at least one processor may be configured to receive a first set of sequences in a second subset of the set of resources from the first plurality of UEs, wherein each sequence in the first set of sequences is associated with the respective sequence ID and is received on at least one symbol identified by the respective resource ID. The at least one processor may be configured to receive a second set of information in a third subset of the set of resources from a second plurality of UEs, the second set of information comprising a position of each UE in the second plurality of UEs, a first set of timing information associated with a second set of sequences, and identifiers of UEs associated with the second set of sequences, wherein the identifiers of the UEs associated with the second set of sequences and the identifiers associated with said each UE of the first plurality of UEs have identifiers in common. The at least one processor may be configured to determine a position of the apparatus based on the received first set of information, the received first set of sequences, and the received second set of information. In an aspect, the first set of sequences includes Zadoff Chu sequences, and each of the sequence IDs comprises a root index and a cyclic shift associated with a Zadoff Chu sequence. In another aspect, each sequence of the first set of sequences occupies an entire bandwidth of the at least one symbol. In one configuration, the at least one processor may be further configured to receive a message from a base station that indicates the first subset of the set of resources, the second subset of the set of resources, and the third subset of the set of resources. In an aspect, the first subset of the set of resources, the second subset of the set of resources, and the third subset of the set of resources occur periodically. In another aspect, the at least one processor may be configured to determine the position of the apparatus by determining a second set of timing information based on the received first set of sequences and by determining the position of the apparatus based on a first subset of the first set of timing information and a second subset of the second set of timing information.

In another aspect, a computer-readable medium associated with a UE and storing computer executable code for wireless communication is provided. The computer-readable medium comprises code for receiving a first set of information in a first subset of a set of resources from a first plurality of UEs, the first set of information comprising identifiers associated with each UE of the first plurality of UEs and further comprising, for said each UE in the first plurality of UEs, a position of said each UE, a sequence identifier (ID), and a resource ID. The computer-readable medium comprises code for receiving a first set of sequences in a second subset of the set of resources from the first plurality of UEs, wherein each sequence in the first set of sequences is associated with the respective sequence ID and is received on at least one symbol identified by the respective resource ID. The computer-readable medium comprises code for receiving a second set of information in a third subset of the set of resources from a second plurality of UEs, the second set of information comprising a position of each UE in the second plurality of UEs, a first set of timing information associated with a second set of sequences, and identifiers of UEs associated with the second set of sequences, wherein the identifiers of the UEs associated with the second set of sequences and the identifiers associated with said each UE of the first plurality of UEs have identifiers in common. The computer-readable medium comprises code for determining a position of the UE based on the received first set of information, the received first set of sequences, and the received second set of information. In an aspect, the first set of sequences includes Zadoff Chu sequences, and each of the sequence IDs comprises a root index and a cyclic shift associated with a Zadoff Chu sequence. In another aspect, each sequence of the first set of sequences occupies an entire bandwidth of the at least one symbol. In one configuration, the computer-readable medium further comprises code for receiving a message from a base station that indicates the first subset of the set of resources, the second subset of the set of resources, and the third subset of the set of resources. In an aspect, the first subset of the set of resources, the second subset of the set of resources, and the third subset of the set of resources occur periodically. In another aspect, the code for determining the position of the UE further comprises code for determining a second set of timing information based on the received first set of sequences and for determining the position of the UE based on a first subset of the first set of timing information and a second subset of the second set of timing information.

DETAILED DESCRIPTION

Figure 1:
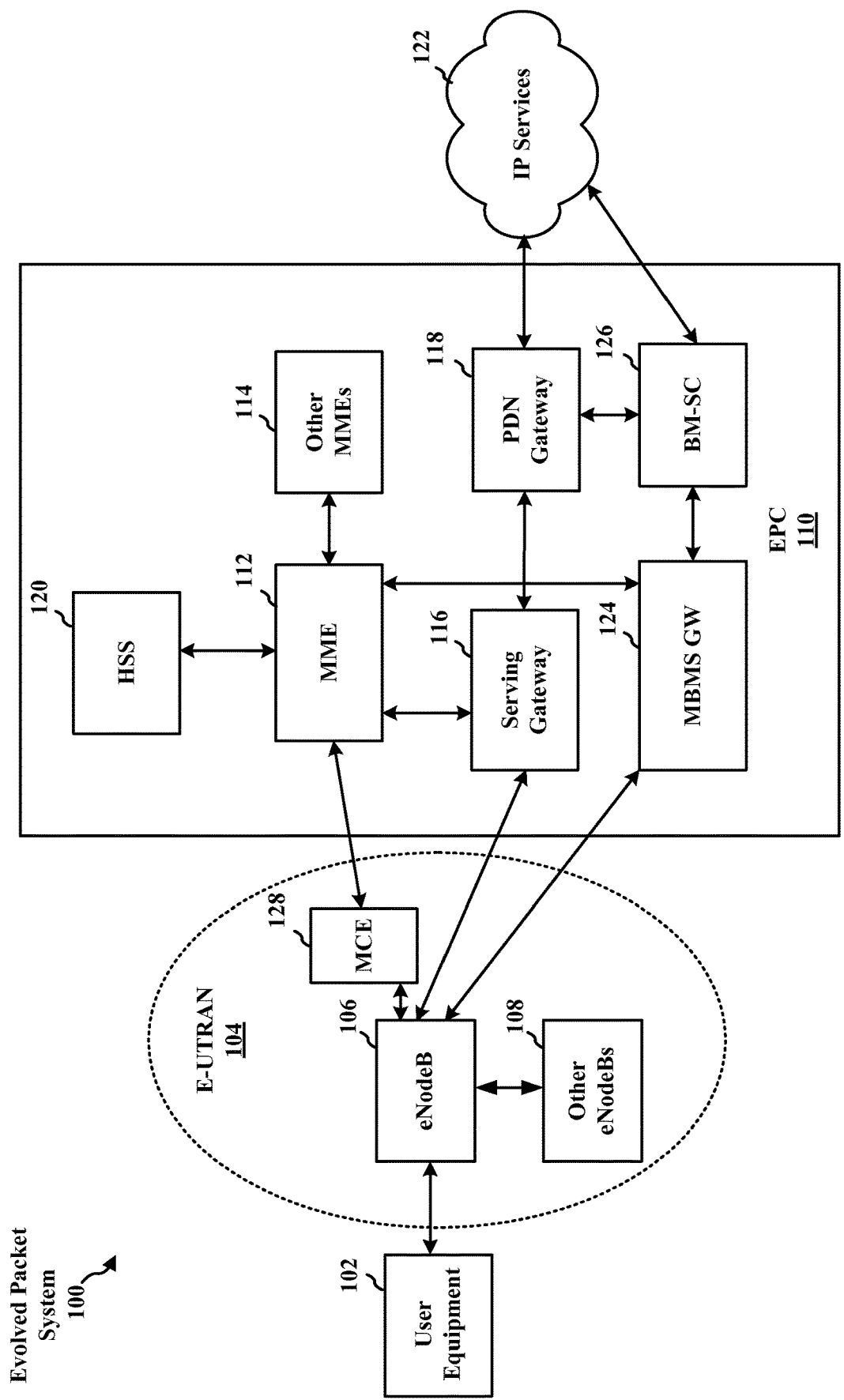
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
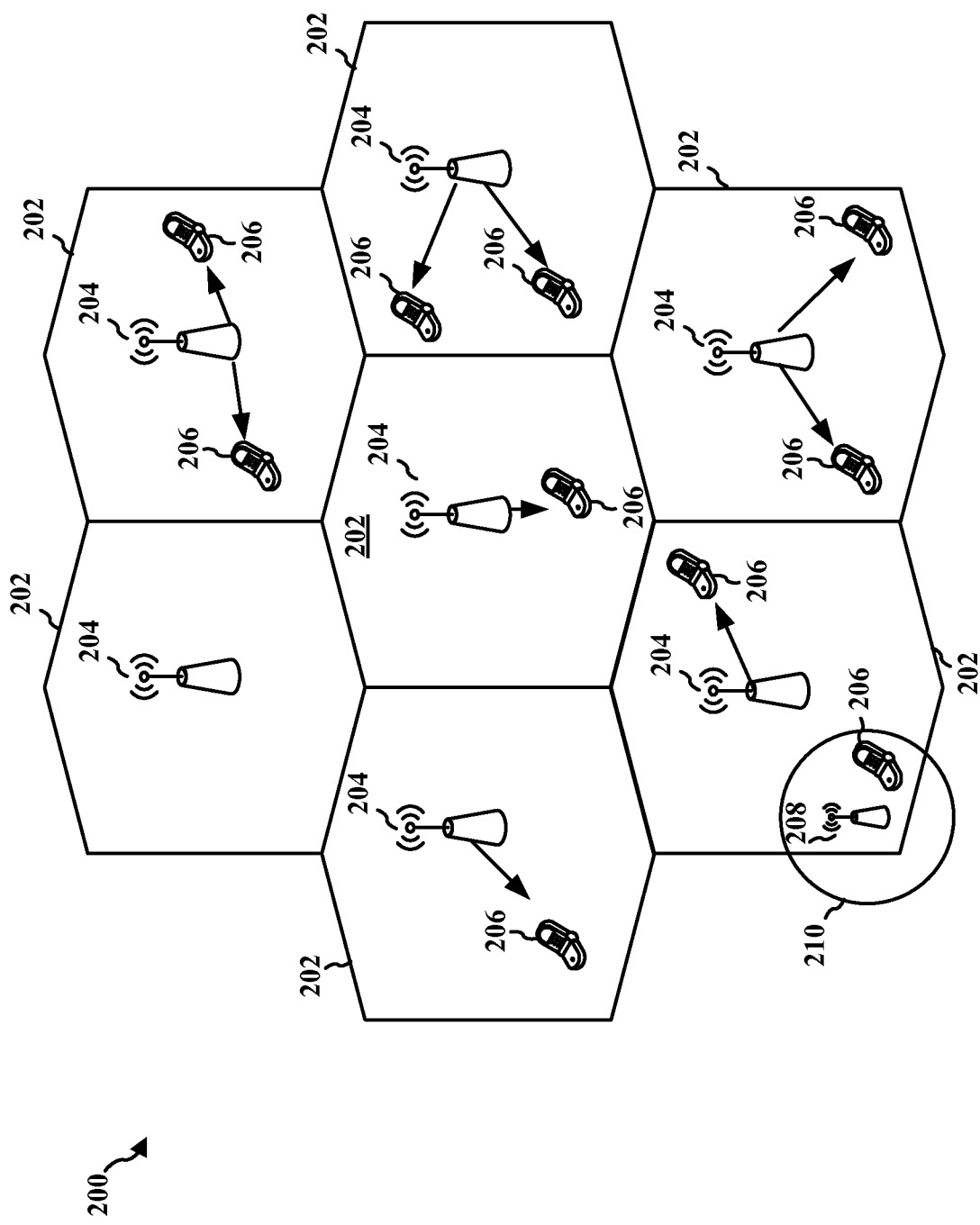
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
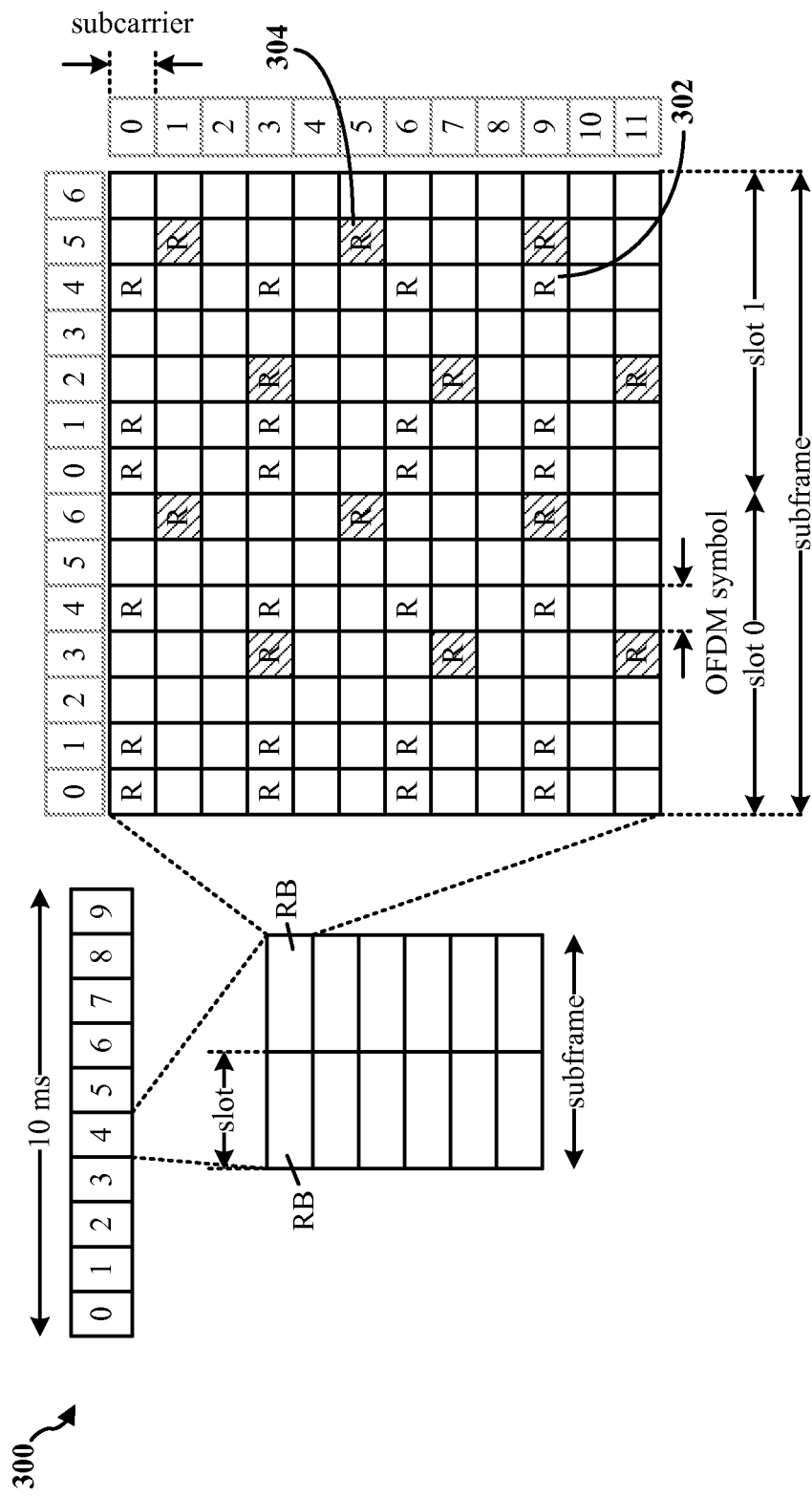
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
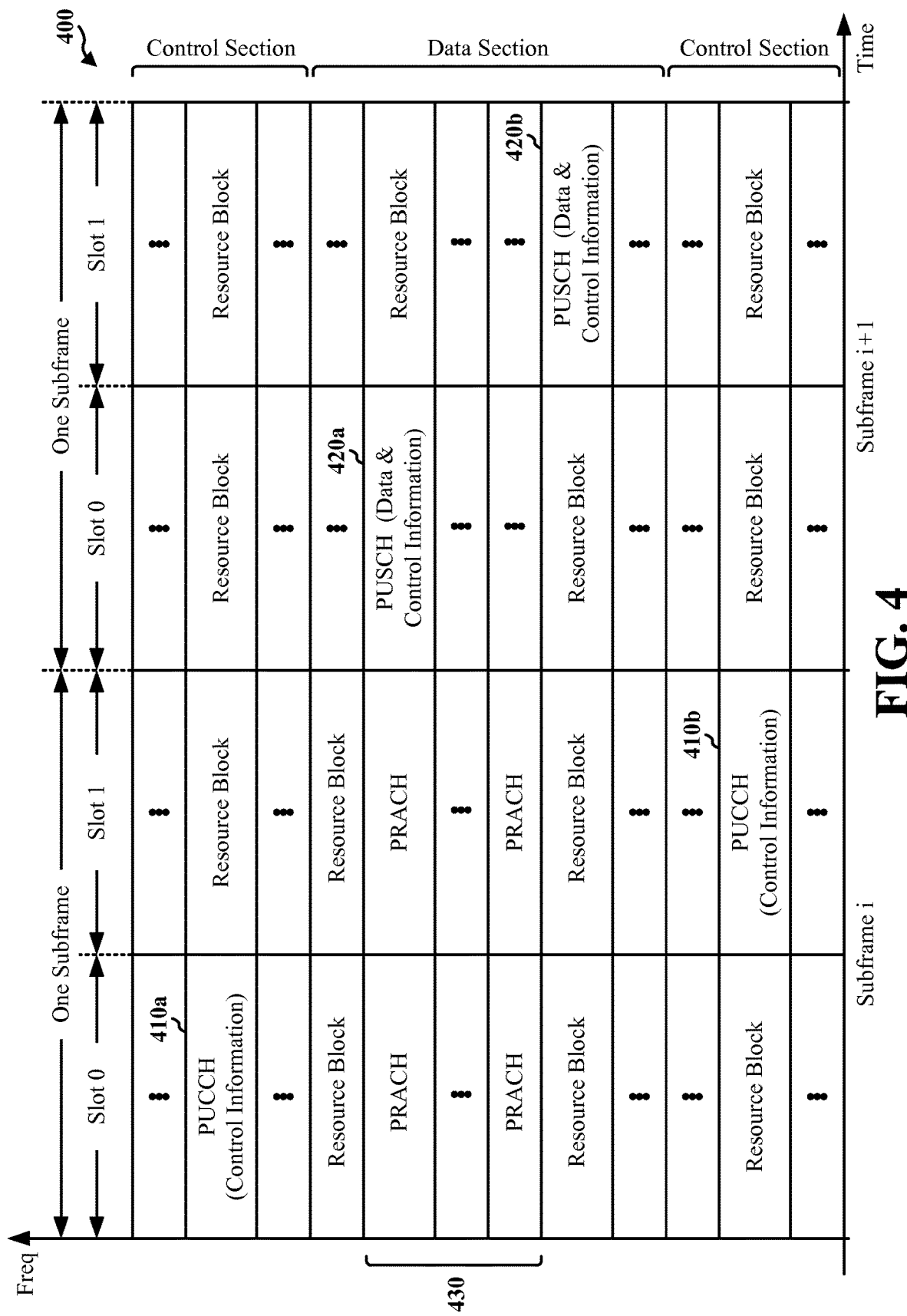
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
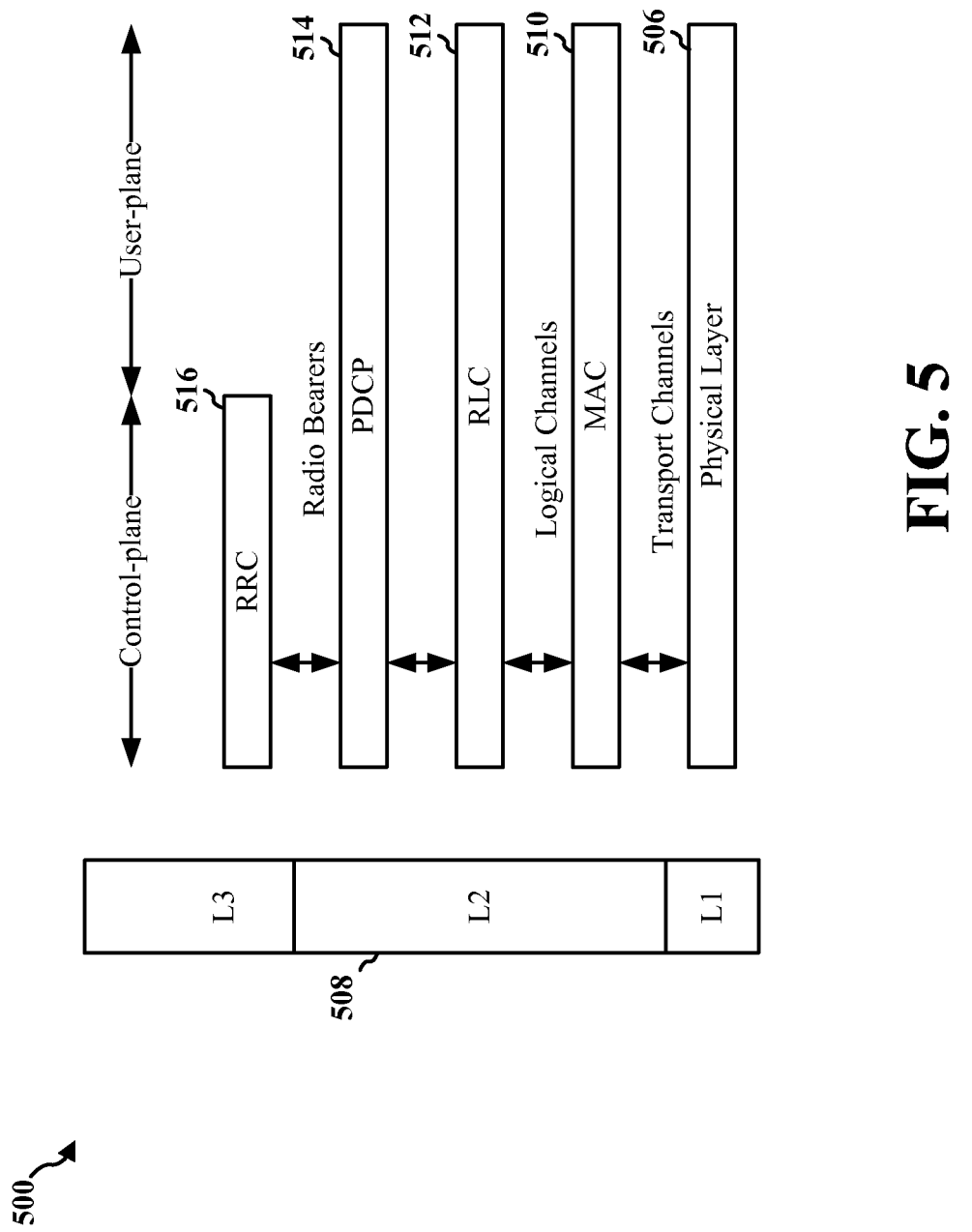
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
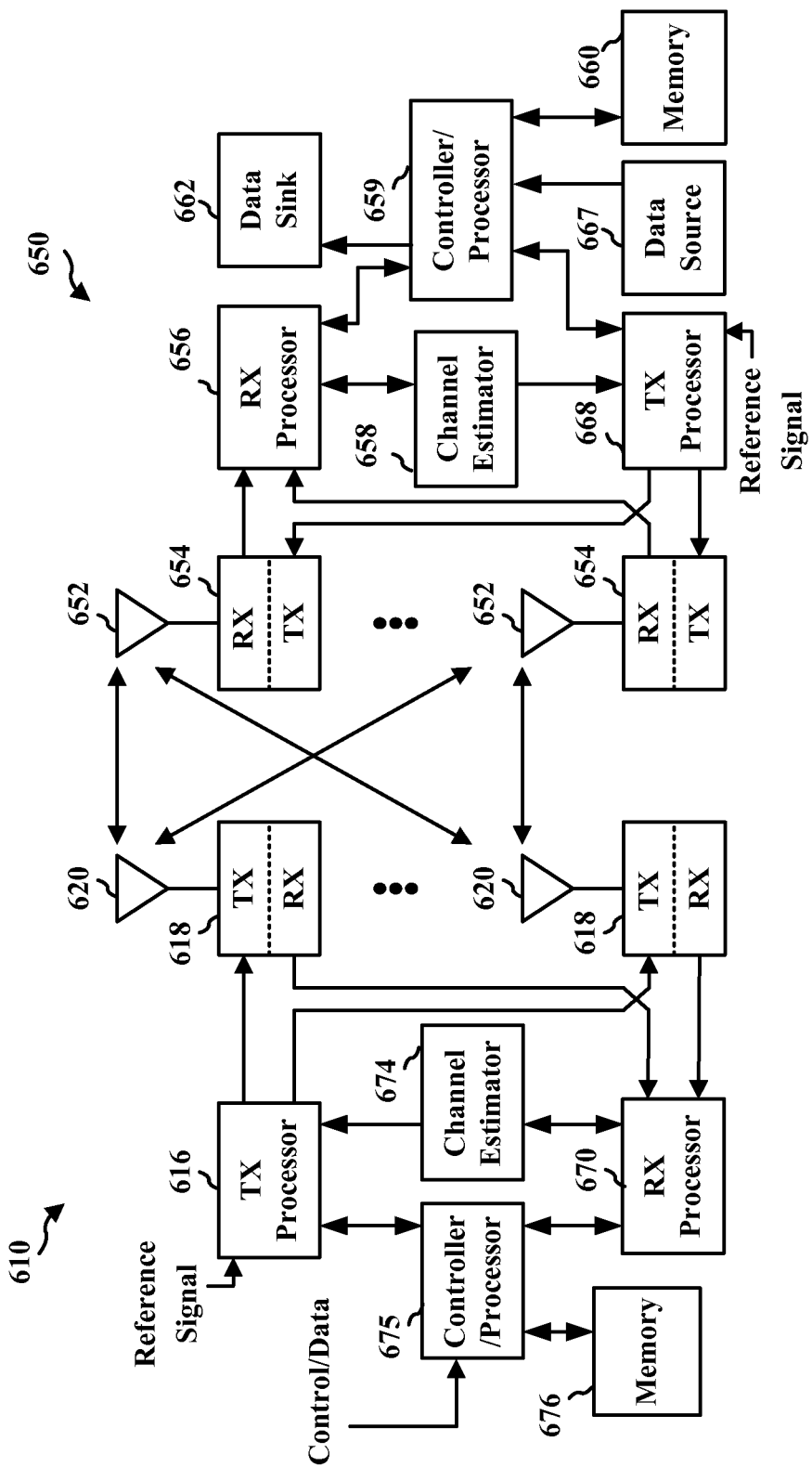
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
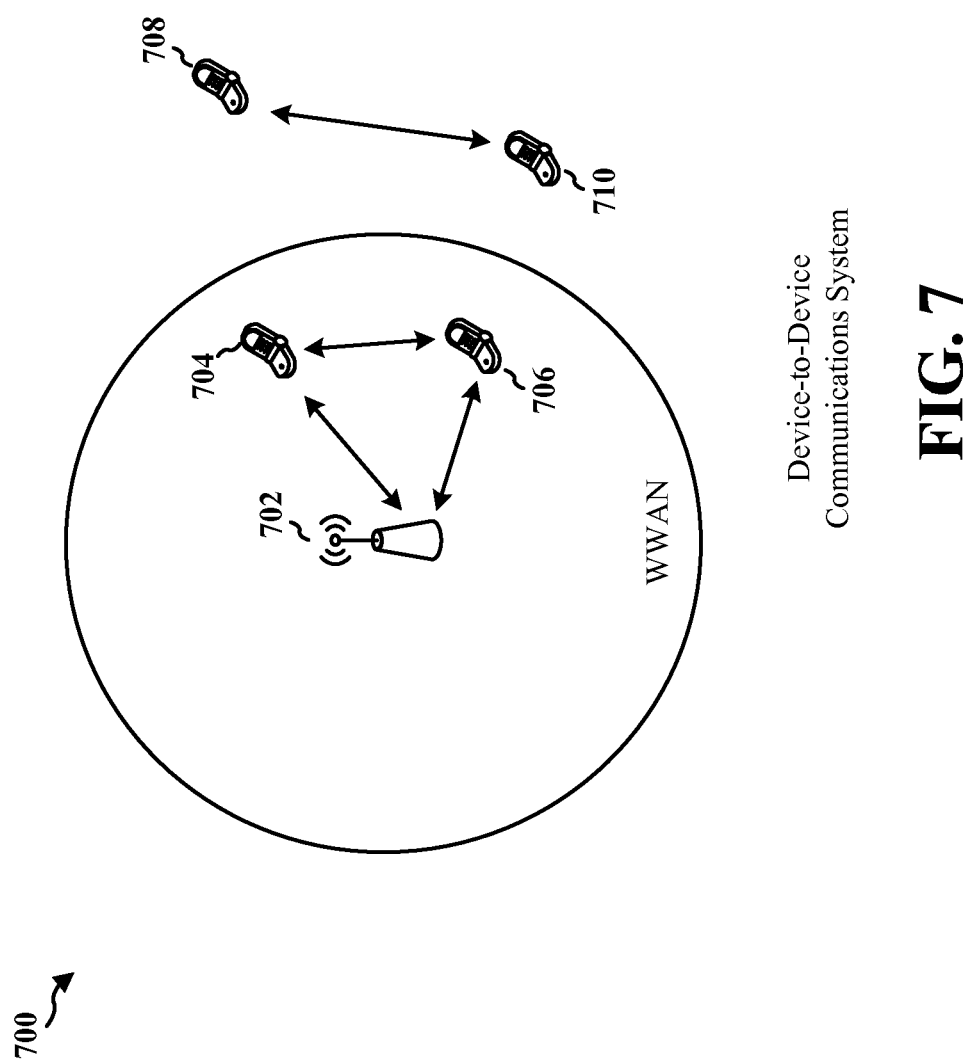
FIG. 7 is a diagram of a device-to-device communications system.

FIG. 7 is a diagram of a device-to-device communications system 700. The device-to-device communications system 700 includes a plurality of wireless devices 704, 706, 708, 710. The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with the base station 702, and some may do both. For example, as shown in FIG. 7, the wireless devices 708, 710 are in device-to-device (or peer-to-peer) communication and the wireless devices 704, 706 are in device-to-device communication. The wireless devices 704, 706 are also communicating with the base station 702.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

In wireless networks, such as an LTE network, some UEs may know their location while other UEs may not. UEs that know their location may determine their location using global positioning system (GPS) technology. In yet another aspect, UEs may have a fixed location that is preconfigured. UEs that do not know their location may lack GPS or may be in an indoor environment. In some instances, UEs that do not know their location may position themselves using signals received from a base station. Positioning using base station signaling, however, may be inaccurate because the distance from the base station to the UE may be difficult to estimate accurately due to a lack of a direct path (e.g., non-line-of-sight). As such, the error in estimation may be significant (e.g., 50 meters or more).

In an aspect, a UE that does not know its location may determine its location from UEs that known their location using D2D positioning. D2D positioning through D2D signaling may be performed using techniques such as time of arrival (TOA) or time difference of arrival (TDOA). A UE may position itself using TOA/TDOA and the known positions of proximate UEs.

Several challenges exist for positioning in a wireless network. One challenge is bandwidth. In LTE, for example, the maximum bandwidth may be 20 MHz per carrier which may limit the accuracy of estimation TOA/TDOA. Estimation accuracy may be improved by receiving D2D signals from many devices and by choosing good measurements. Another challenge is the timing offset among UEs, which may be up to a few microseconds. The timing offset may cause significant inaccuracies in estimating the TOA or TDOA. Yet another challenge is power consumption. If UEs have to be RRC_CONNCTED to perform positioning, then positioning may be power and resource consuming. As such, a need exists for using D2D positioning to enable UEs to determine their location in either RRC_CONNECTED or RRC_IDLE mode.

Figure 8:
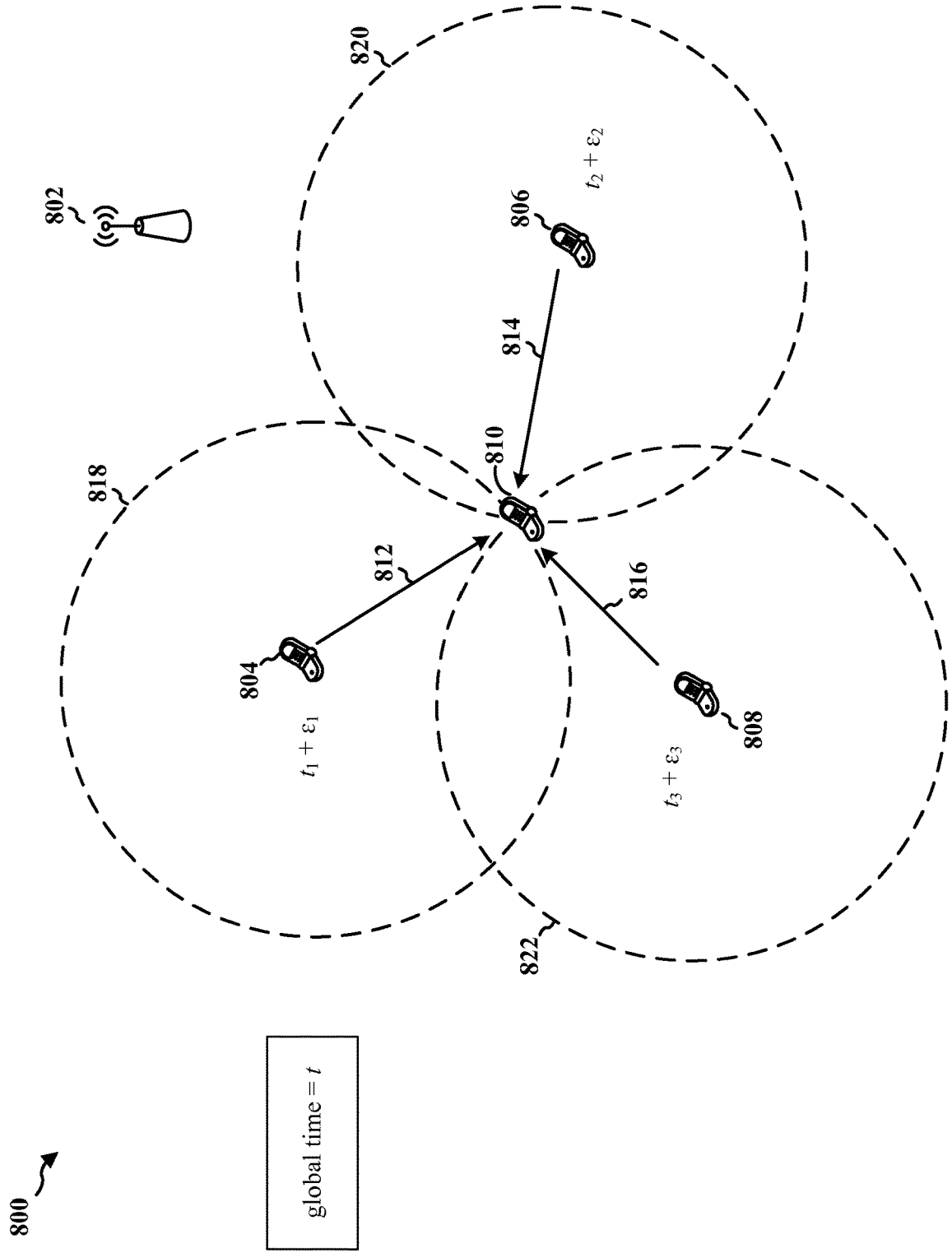
FIG. 8 illustrates a method for determining a device position using D2D positioning in a wireless network.

FIG. 8 illustrates a method for determining a device position using D2D positioning in a wireless network 800. Referring to FIG. 8, a base station 802 (e.g., an eNB) may be associated with a cell that includes UEs 804, 806, 808, 810. The cell may also include other UEs that are not pictured. The UEs 804, 806, 808 may be a group of UEs in which each of the UEs 804, 806, 808 knows its respective position/location. The UEs that are aware of their positions may be referred to as reference UEs or reference nodes. As such, the UEs 804, 806, 808 may be referred to as reference UEs. References UEs may transmit a D2D positioning message to help the UE 810 determine a position of the UE 810.

Referring to FIG. 8, each of the UEs 804, 806, 808 may transmit a respective positioning message 812, 814, 816 to the UE 810 (e.g., a D2D message). Each respective positioning message 812, 814, 816 may indicate a time at which the respective positioning message 812, 814, 816 is transmitted along with location information (e.g., x and y coordinates) of each of the respective UEs 804, 806, 808. In an ideal case, in which no synchronization offset exists between the UEs 804, 806, 808, 810, the UE 810 may determine a TOA for each of the three positioning messages 812, 814, 816 associated with the UE 804, 806, 808, respectively. Based on the difference between the TOA and the time at which the respective positioning messages 812, 814, 816 were sent, the UE 810 may determine the distance between each of the UEs 804, 806, 810 and the UE 810. For example, $\hat{d}_1$ may represent the measured distance (e.g., $\Delta t^*c$) between the UE 804 and the UE 810, $\hat{d}_2$ may represent the measured distance between the UE 806 and the UE 810, and $\hat{d}_3$ may represent the measured distance between the UE 808 and the UE 810. In this example, $\Delta t$ represents the difference between a TOA and when a positioning message is sent and c represents the speed of light.

In one aspect, the UE 810 may determine its location using three circular regions 818, 820, 822. The three circular regions 818, 820, 822 may be based on the three measured distances $\hat{d}_1$, $\hat{d}_2$, $\hat{d}_3$ between the UEs 804, 806, 808 and the UE 810 and on the known sets of coordinates $(x_1, y_1)$, $(x_2, y_2)$, and $(x_3, y_3)$ which represent the position of each of the UEs 804, 806, 808, respectively. The known coordinates may represent the center of the circular region, and the distances may represent the radius of the circular region. The UE 810 may determine its position based on where the three circular regions 818, 820, 822 intersect.

In another aspect, the UE 804 may be associated with the known coordinates $(x_1, y_1)$, the UE 806 may be associated with the known coordinates $(x_2, y_2)$, the UE 808 may be associated with the known coordinates $(x_3, y_3)$, and the UE 810 may be associated with unknown coordinates $(x_4, y_4)$. Using the following equations, the UE 810 may determine its location by solving for $(x_4, y_4)$:

$$(x_4-x_1)^2+(y_4-y_1)^2=\hat{d}_1^2 \quad \text{(Eq. 1)}$$

$$(x_4-x_2)^2+(y_4-y_2)^2=\hat{d}_2^2 \quad \text{(Eq. 2)}$$

$$(x_4-x_3)^2+(y_4-y_3)^2=\hat{d}_3^2 \quad \text{(Eq. 3)}$$

These examples, however do not consider timing offsets between the UEs 804, 806, 808, 810. Small timing offsets between UEs may lead to significant inaccuracies. For example, a 100 ns timing offset between two reference UEs may result in a 30 meter positioning error (e.g., 100 ns*3× $10^8$ m/s). To illustrate the timing offset problem, referring to FIG. 8, assume a global clock may be denoted by t. The UE 804 may be configured to transmit the positioning message 812 at time $t_1$, the UE 806 may be configured to transmit the positioning message 814 at time $t_2$, and the UE 808 may be configured to transmit the positioning message 816 at time $t_3$. Each of the UEs 804, 806, 808 may have a timing error/offset from the global clock t, such that the UE 804 actually transmits at $t_1+\varepsilon_1$, the UE 806 actually transmits at $t_2+\varepsilon_2$, and the UE 808 actually transmits at $t_3+\varepsilon_3$. Because the UE 810 may be unaware of each of the timing offsets $\varepsilon_1$, $\varepsilon_2$, $\varepsilon_3$, the UE 810 may not accurately determine the measured distances $\hat{d}_1$, $\hat{d}_2$, $\hat{d}_3$ between the UEs 804, 806, 808 and the UE 810. As such, a protocol is needed that allows RRC_IDLE and RRC_CONNECTED UEs to determine their position using D2D positioning.

Figure 9A:
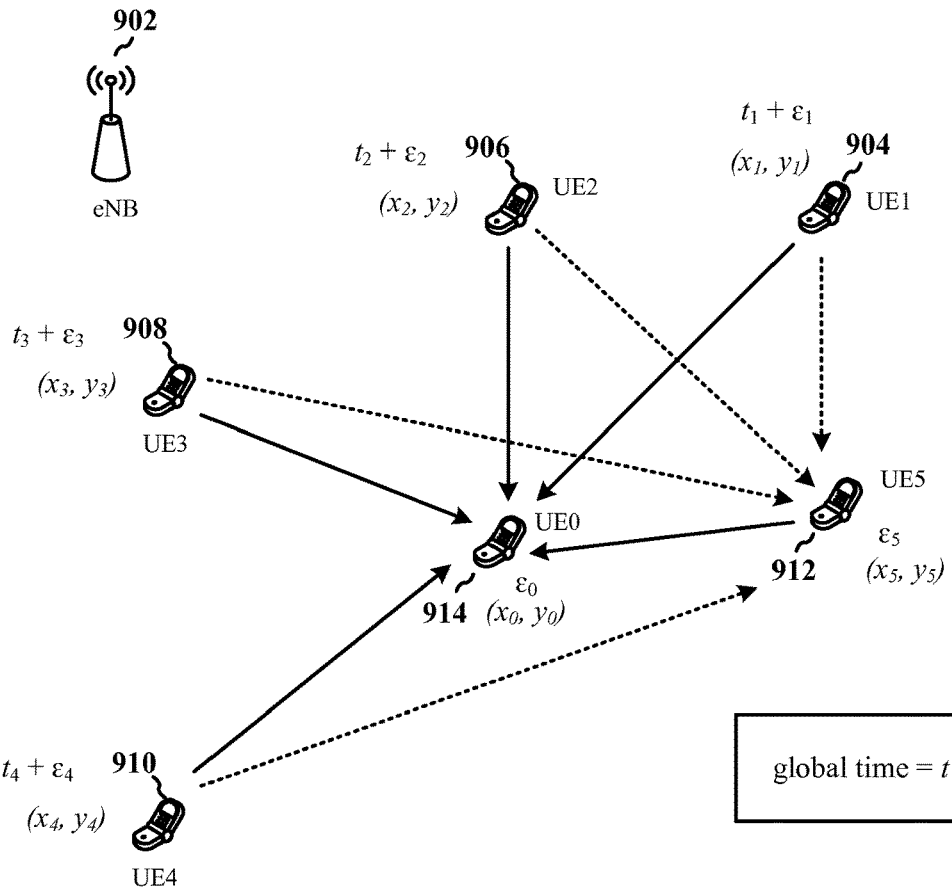
FIGS. 9A-B illustrate an exemplary method for performing D2D positioning in a wireless network.
Figure 9B:
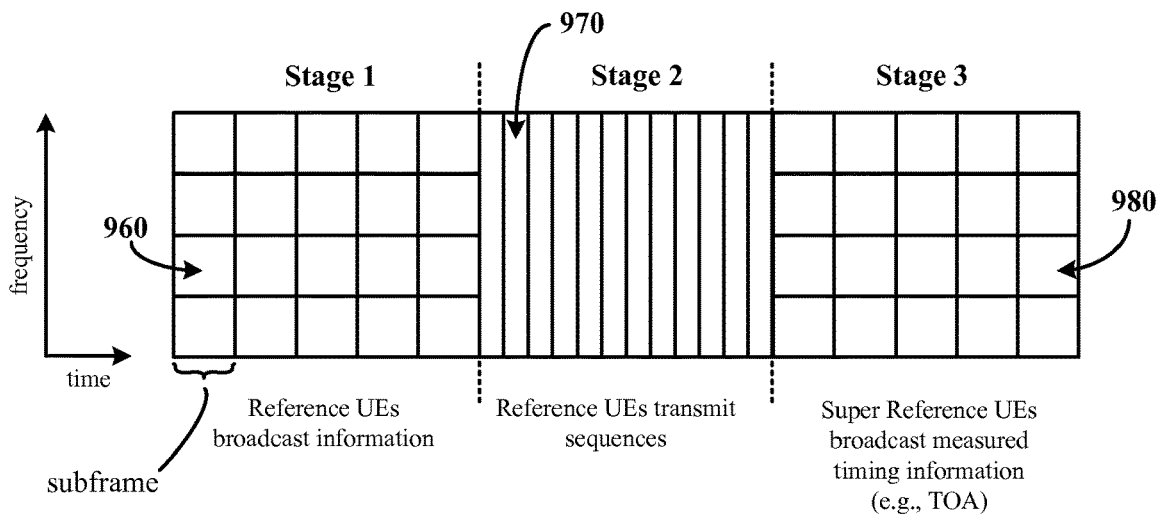

FIGS. 9A-B illustrate an exemplary method for performing D2D positioning in a wireless network 900. Referring to FIG. 9A, a base station 902 (e.g., an eNB) may be associated with a cell that may include the UEs 904, 906, 908, 910, 912, 914. The cell may include other UEs that are not pictured. The UEs 904, 906, 908, 910, 912 may each know their respective position/location $(x_1, y_1)$, $(x_2, y_2)$, $(x_3, y_3)$, $(x_4, y_4)$, $(x_5, y_5)$, respectively, and the UE 914 may not know its location $(x_0, y_0)$. In FIG. 9A, the UEs 904, 906, 908, 910, 912 may be associated with a first set of UEs, which know their location (e.g., the set of UEs that know their location may be denoted by set A). The UE 914 and any other UEs that do not know their location may be associated with a second set of UEs (e.g., the set of UEs that do not know their location may be denoted by set B). Within the first set of UEs, the UEs 904, 906, 908, 910 may be a first reference UE type, and the UE 912 may be a second reference UE type (e.g., a super reference UE). UEs of the first reference UE type may broadcast sequences for positioning (e.g., a Zadoff Chu sequence). UEs of the second reference UE type may broadcast timing information, such as time of arrival or time difference of arrival, associated with broadcasted sequences from UEs of the first reference UE type. To determine the location/position of the UE 914, the UE 914 may utilize a distributed MAC protocol for positioning. The UE 914 may utilize a set of resources (e.g., a positioning phase) to determine a position associated with the UE 914.

FIG. 9B illustrates a set of resources 950 that may be used for D2D positioning. The set of resources 950 may include a number of consecutive subframes. In an aspect, the set of resources 950 may occur periodically (e.g., once every 5 seconds). If a UE (e.g., the UE 914) is RRC_IDLE, then the UE may sleep between adjacent periods of the sets of resources 950 to save power.

As shown in FIG. 9B, the set of resources 950 may include three subsets of resources: a first subset of the set of resources 950 corresponding to stage 1, a second subset of the set of resources 950 corresponding to stage 2, and a third subset of the set of resources 950 corresponding to stage 3. In an aspect, each column in the first and third subsets of resources may correspond to a subframe with corresponding subcarriers, and each block within the column may be associated with a subset of the subcarriers within the subframe. Each column in the second subset of resources may correspond to a symbol (e.g., an OFDM symbol) and may include all of the corresponding subcarriers associated with the symbol.

In an aspect, the base station 902 may transmit a message indicating the set of resources 950 to the UEs 904, 906, 908, 910, 912, 914. The message may indicate the first subset, the second subset, and/or the third subset of the set of resources 950. Each of the UEs 904, 906, 908, 910, 912, 914 may identify the set of resources 950 and each of the first subset, the second subset, and/or the third subset of the set of resources 950 based on the message received from the base station 902.

Referring to FIG. 9A, each UE of the first reference UE type may determine its position. For example, the UE 904 determines its position $(x_1, y_1)$, the UE 906 determines its position $(x_2, y_2)$, the UE 908 determines its position $(x_3, y_3)$, and the UE 910 determines its position $(x_4, y_4)$. In one aspect, the position of each respective UE may be determined based on GPS technology. In another aspect, each respective UE may be in a fixed location, and the position may be determined based on preconfigured settings/information. Similarly, each UE of the second reference UE type may determine its position. For example, the UE 912 may determine its position $(x_5, y_5)$. The UE 914, however, may not know its position $(x_0, y_0)$.

In the first subset of the set of resources 950, each UE of the first reference UE type may broadcast information in the first subset of the set of resources 950. For example, the UE 904 may broadcast information in the first subset of the set of resources. The information may include an identifier identifying the UE 904, a position of the UE 904, a sequence ID, and a resource ID. The sequence ID may identify a positioning sequence to be broadcasted in the second subset of the set of resources 950 (e.g., in stage 2). In an aspect, the sequence may be a Zadoff Chu sequence, and the sequence ID may correspond to the root index and cyclic shift of the Zadoff Chu sequence. Other sequences and corresponding forms of sequence IDs may also be used. The resource ID may identify at least one symbol in the second subset of the set of resources 950 in which the sequence may be transmitted by the UE 904. In an aspect, the resource ID may indicate a relative position of one or more symbols within a subframe. In an aspect, the UE 904 may determine the at least one symbol in the second subset of the set of resources 950 in which to broadcast the sequence. In one instance, the UE may determine the at least one symbol autonomously, such as by random selection or by energy-based detection. In energy-based detection, the UE 904 may detect the energy level of one or more symbols in the second subset of the set of resources 950 and select the at least one symbol with the lowest energy detected for broadcasting the sequence. In another instance, the UE 904 may receive a message from the base station 902 indicating which symbol(s) within the second subset of the set of resources 950 to select for broadcasting the sequence. In this aspect, the UE 904 may choose the symbol(s), or choose from among the symbol(s), indicated by the base station 902. In an aspect, the message in which the base station 902 indicates which symbol(s) to select within the second subset of the set of resources 950 may be the same message that indicates the first, second, and third subset of the set of resources 950 as discussed supra.

In one configuration, with respect to broadcasting the information in the first subset of the set of resources 950, the UE 904 may determine at least one resource, which may occupy one subframe and $m_1$ resource blocks (e.g., a resource 960 within a subframe), within the first subset of the set of resources 950 to broadcast the information. In an aspect, the UE 904 may determine the at least one resource autonomously, such as by random selection or by energy-based detection. In energy-based detection, the UE 904 may detect the energy level of one or more resources in the first subset of the set of resources 950 and select the at least one resource with the lowest energy detected for broadcasting the information. In another aspect, the UE 904 may receive a message from the base station 902 indicating which resource(s) within the first subset of the set of resources 950 to select for broadcasting the information. In this aspect, the UE 904 may choose the resource(s), or choose from among the resource(s), indicated by the base station 902. In an aspect, the message in which the base station 902 indicates which resource to select within the first subset of the set of resources 950 may be the same message that indicates the first, second, and third subset of the set of resources 950 as discussed supra. Further, in addition to the UE 904, other UEs of the first reference UE type, such as the UEs 906, 908, 910 may broadcast respective information (e.g., position, sequence ID, resource ID) associated which each of the UEs 906, 908, 910. In an aspect, the UEs 904, 906, 908, 910 may broadcast information in different resources within the first subset of the set of resources 950.

In the first subset of the set of resources 950 (e.g., stage 1), each UE of the second reference UE type (e.g., the UE 912) and second set of UEs unaware of their location (e.g., the UE 914) may listen for or receive a first set of information, which may include the information broadcasted (e.g., position, resource ID, sequence ID) by the UEs 904, 906, 908, 910 of the first reference UE type.

After broadcasting the information in the first subset of the set of resources 950, the UE 904 may broadcast the sequence associated with the sequence ID in at least one symbol (e.g., a symbol 970) of the second subset of the set of resources 950. The sequence may be broadcasted in the resource ID indicated in the broadcasted information. In an aspect, the sequence may occupy an entire bandwidth (e.g., all of the subcarriers) of the at least one symbol. Similarly, the UEs 904, 906, 908, 910 may broadcast the respective sequence on the at least one symbol specified in the previously broadcasted information (e.g., the message indicating the resource ID). In another aspect, the UEs 904, 906, 908, 910 may broadcast the respective sequences in different symbols within the second subset of the set of resources 950. The sequence broadcasted may be a Zadoff Chu sequence (or another type of sequence) and may occupy at least one symbol time and the entire allocated bandwidth (e.g., 20 MHz, 40 MHz, etc.). Using a larger bandwidth to broadcast the sequence may improve accuracy. In an aspect, broadcasting the sequence on one symbol may allow for less resource overhead. As discussed in FIG. 8, however, each of the UEs may have a different timing offset. For example, assuming a global time t, the UEs 904, 906, 908, 910 may transmit the sequence at times $t_1, t_2, t_3, t_4$, respectively. Each of the UEs 904, 906, 908, 910 may have a timing offset $\varepsilon_1, \varepsilon_2, \varepsilon_3, \varepsilon_4$, respectively. As such, the actual times at which the UEs 904, 906, 908, 910 may transmit the sequence may be $t_1+\varepsilon_1$, $t_2+\varepsilon_2$, $t_3+\varepsilon_3$, $t_4+\varepsilon_4$, respectively. In an aspect, the UE 914 may have a timing offset $\varepsilon_0$, and the UE 912 may have a timing offset $\varepsilon_5$.

In the second subset of the set of resources 950 (e.g., stage 2), each UE of the second reference UE type (e.g., the UE 912) and second set of UEs unaware of their location (e.g., the UE 914) may listen for or receive a set of sequences (e.g., the broadcast sequences) from the UEs 904, 906, 908, 910 of the first reference UE type. In an aspect, each sequence in the set of sequences may be mutually orthogonal to each other (e.g., the UEs 904, 906, 908, 910 may select among 8 different root indices and offsets that may be associated with sequences that are mutually orthogonal). In this aspect, one symbol may have more than one sequence. Based on the broadcasted information and sequences, the UE 912 and the UE 914 may know the position (or location) of each of the UEs 904, 906, 908, 910 and be able to determine a respective time of arrival for the sequence received from each of the respective UEs 904, 906, 908, 910. The time of arrival may correspond to when each sequence was received.

In the third subset of the set of resources 950 (e.g., stage 3), each UE of the second reference UE type (e.g., the UE 912) may broadcast a second set of information. For example, the UE 912 may broadcast the second set of information. The second set of information may include the position or location of the UE 912. The second set of information may include identifiers identifying the UEs of the first reference UE type from which the UE 912 received sequences in the second subset of the set of resources 950. In one instance, the UE 912 may receive sequences from all of the UEs 904, 906, 908, 910, but in other instances, due to interference or distance, the UE 912 may only receive sequences from a subset of the UEs 904, 906, 908, 910. As such, the UEs 912, 914 may receive sequences from different UEs of the first reference UE type based on network conditions and distance from the UEs of the first reference UE type. The second set of information may include timing information, such as a time of arrival or a time difference of arrival, associated with the set of sequences received from UEs of the first reference UE type (e.g., the UEs 904, 906, 908, 910). In an aspect, the time difference of arrival represents the difference in time of arrivals between two sequences received from different UEs of the first reference UE type (e.g., the UE 904 and the UE 906). In another aspect, the set of sequences may have n sequences. The second set of information may include identifiers associated with UEs of the first reference UE type (e.g., the second set of information may include identifiers for the UEs 904, 906, 908, 910) for which a sequence was received by the UE 912.

In another aspect, the UE 912 (and other UEs of the second reference UE type) may receive a message from the base station 902 that indicates the third subset of the set of resources 950. The message may also indicate the first and second subsets of the set of resources 950. The UE 912 may determine at least one resource (e.g., a resource 980) for broadcasting the second set of information in the third subset of the set of resources 950 based on the message received from the base station 902. In an aspect, the UE 912 may determine the at least one resource autonomously, using a random selection or an energy-based detection. In another aspect, the UE 912 may determine the at least one resource based on an indication from the base station 902. For example, the base station 902 may indicate at least one resource in the third subset of the set of resources for transmitting the second set of information.

After stage 3, the UE 914 may have received the first set of information in the first subset of the set of resources 950 from the UEs 904, 906, 908, 910 indicating an identifier and a position of each of the UEs 904, 906, 908, 910, received sequences in the second subset of the set of resources 950 for D2D positioning from the UEs 904, 906, 908, 910, and received the second set of information from the UE 912. The second set of information may include the position of the UE 912, identifiers of the UEs (e.g., one or more of the UEs 904, 906, 908, 910) from which the UE 912 received sequences in the second subset of the set of resources 950, and timing information associated with the received sequences. Based on the aforementioned received first set of information, the received sequences, and the received second set of information, the UE 914 may determine its position based on the following equations:

$$\hat{d}_{10} = \left(\varepsilon_1 - \varepsilon_0 + \frac{d_{10}}{c}\right)c = d_{10} + (\varepsilon_1 - \varepsilon_0)c \quad \text{(Eq. 4)}$$

$$\hat{d}_{20} = \left(\varepsilon_2 - \varepsilon_0 + \frac{d_{20}}{c}\right)c = d_{20} + (\varepsilon_2 - \varepsilon_0)c \quad \text{(Eq. 5)}$$

$$\hat{d}_{30} = \left(\varepsilon_3 - \varepsilon_0 + \frac{d_{30}}{c}\right)c = d_{30} + (\varepsilon_3 - \varepsilon_0)c \quad \text{(Eq. 6)}$$

$$\hat{d}_{40} = \left(\varepsilon_4 - \varepsilon_0 + \frac{d_{40}}{c}\right)c = d_{40} + (\varepsilon_4 - \varepsilon_0)c \quad \text{(Eq. 7)}$$

$$\hat{d}_{15} = \left(\varepsilon_1 - \varepsilon_5 + \frac{d_{15}}{c}\right)c = d_{15} + (\varepsilon_1 - \varepsilon_5)c \quad \text{(Eq. 8)}$$

$$\hat{d}_{25} = \left(\varepsilon_2 - \varepsilon_5 + \frac{d_{25}}{c}\right)c = d_{25} + (\varepsilon_2 - \varepsilon_5)c \quad \text{(Eq. 9)}$$

$$\hat{d}_{35} = \left(\varepsilon_3 - \varepsilon_5 + \frac{d_{35}}{c}\right)c = d_{35} + (\varepsilon_3 - \varepsilon_5)c \quad \text{(Eq. 10)}$$

$$\hat{d}_{45} = \left(\varepsilon_4 - \varepsilon_5 + \frac{d_{45}}{c}\right)c = d_{45} + (\varepsilon_4 - \varepsilon_5)c \quad \text{(Eq. 11)}$$

Referring to the above equations, $\hat{d}_{10}$ corresponds to the measured distance (e.g., $\Delta t*c$) between the UE 904 and the UE 914, in which $\Delta t$ represents the difference between when the sequence was received from the UE 904 (e.g., TOA) and when the sequence was sent by the UE 904, and c represents the speed of light. The actual distance between the UE 904 and the UE 914 is represented by $d_{10}$, which is the actual distance between points $(x_1, y_1)$ and $(x_0, y_0)$ of which only $(x_1, y_1)$ is known by the UE 914. As such, the measured distance $\hat{d}_{10}$ is based on the actual distance $d_{10}$ plus any distance $(\varepsilon_1-\varepsilon_0)c$ resulting from the timing offset between the UEs 904, 914. Similarly, $\hat{d}_{20}$ corresponds to the measured distance between the UE 906 and the UE 914, $d_{20}$ represents the actual distance between the UE 906 and the UE 914, $\hat{d}_{30}$ corresponds to the measured distance between the UE 908 and the UE 914, $d_{30}$ represents the actual distance between the UE 908 and the UE 914, $\hat{d}_{40}$ corresponds to the measured distance between the UE 910 and the UE 914, $d_{40}$ represents the actual distance between the UE 910 and the UE 914, $\hat{d}_{15}$ corresponds to the measured distance between the UE 904 and the UE 912, $d_{15}$ represents the actual distance between the UE 904 and the UE 912, $\hat{d}_{25}$ corresponds to the measured distance between the UE 906 and the UE 912, $d_{25}$ represents the actual distance between the UE 906 and the UE 912, $\hat{d}_{35}$ corresponds to the measured distance between the UE 908 and the UE 912, $d_{35}$ represents the actual distance between the UE 908 and the UE 912, $\hat{d}_{45}$ corresponds to the measured distance between the UE 910 and the UE 912, and $d_{45}$ represents the actual distance between the UE 910 and the UE 912. In an aspect, the UE may determine $\hat{d}_{15}$, $\hat{d}_{25}$, $\hat{d}_{35}$, and $\hat{d}_{45}$ based on the received timing information (e.g., TOA) from the UE 912. For example, $\hat{d}_{15} = \Delta t^* c$, where $\Delta t$ is the difference between the TOA of the sequence and when the sequence is sent. The UE 914 may know when the sequences are sent because the UE 914 may receive the same sequences from the UEs 904, 906, 908, 910 on the symbols identified by the resource IDs broadcast by UEs 904, 906, 908, 910 in the first subset of the set of resources 950. Alternatively, the UE 914 may know when the sequences are sent because the UE 912 may provide information on when each respective sequence is sent by the UEs 904, 906, 908, 910 in the second set of information. In another aspect, the UE 912 may send $\Delta t$ to the UE 914. Subsequently, the UE 914 may take the difference of the above equations to obtain the following equations:

$$\hat{d}_{10} - \hat{d}_{20} = d_{10} - d_{20} + (\varepsilon_1 - \varepsilon_2)c \qquad \text{(Eq. 12)}$$

$$\hat{d}_{20} - \hat{d}_{30} = d_{20} - d_{30} + (\varepsilon_2 - \varepsilon_3)c \qquad \text{(Eq. 13)}$$

$$\hat{d}_{30} - \hat{d}_{40} = d_{30} - d_{40} + (\varepsilon_3 - \varepsilon_4)c \qquad \text{(Eq. 14)}$$

$$\hat{d}_{15} - \hat{d}_{25} = d_{15} - d_{25} + (\varepsilon_1 - \varepsilon_2)c \qquad \text{(Eq. 15)}$$

$$\hat{d}_{25} - \hat{d}_{35} = d_{25} - d_{35} + (\varepsilon_2 - \varepsilon_3)c \qquad \text{(Eq. 16)}$$

$$\hat{d}_{35} - \hat{d}_{45} = d_{35} - d_{45} + (\varepsilon_3 - \varepsilon_4)c \qquad \text{(Eq. 17)}$$

As shown above, by taking the difference, the timing offset $\varepsilon_0$ was canceled out. Alternatively, the Eqs. 12-17, and more specifically the values for $\hat{d}_{15} - \hat{d}_{25}$, $\hat{d}_{25} - \hat{d}_{35}$, and $\hat{d}_{35} - \hat{d}_{45}$, may be determined by the UE 914 if the UE 912 provides the TDOA of the sequences received by the UE 912 from the UEs 904, 906, 908, 910. In this alternative, the UE 914 may know when the sequences were sent because the same sequences were received by the UE 914. In another aspect, the UE 914 may know when the sequences were sent because the UE 912 may indicate when the sequences were sent in the second set of information.

After obtaining Eqs. 12-17, the UE 914 may take another difference of the Eqs. 12-17 (e.g., so called taking a double difference), to obtain the following equations:

$$(\hat{d}_{10} - \hat{d}_{20}) - (\hat{d}_{15} - \hat{d}_{25}) = (d_{10} - d_{20}) - (d_{15} - d_{25}) \qquad \text{(Eq. 18)}$$

$$(\hat{d}_{20} - \hat{d}_{30}) - (\hat{d}_{25} - \hat{d}_{35}) = (d_{20} - d_{30}) - (d_{25} - d_{35}) \qquad \text{(Eq. 19)}$$

$$(\hat{d}_{30} - \hat{d}_{40}) - (\hat{d}_{35} - \hat{d}_{45}) = (d_{30} - d_{40}) - (d_{35} - d_{45}) \qquad \text{(Eq. 20)}$$

In Eqs. 18-20, the remaining timing offsets $\varepsilon_1$, $\varepsilon_2$, $\varepsilon_3$, $\varepsilon_4$ also canceled out. Using Eqs. 18-20, the UE 914 may solve for the two unknown variables $x_0$ and $y_0$ corresponding to the position of the UE 914. In an aspect, the UE 914 may determine its position using the aforementioned D2D signaling and protocol in either RRC_CONNCTED or RRC_IDLE mode.

Figure 10:
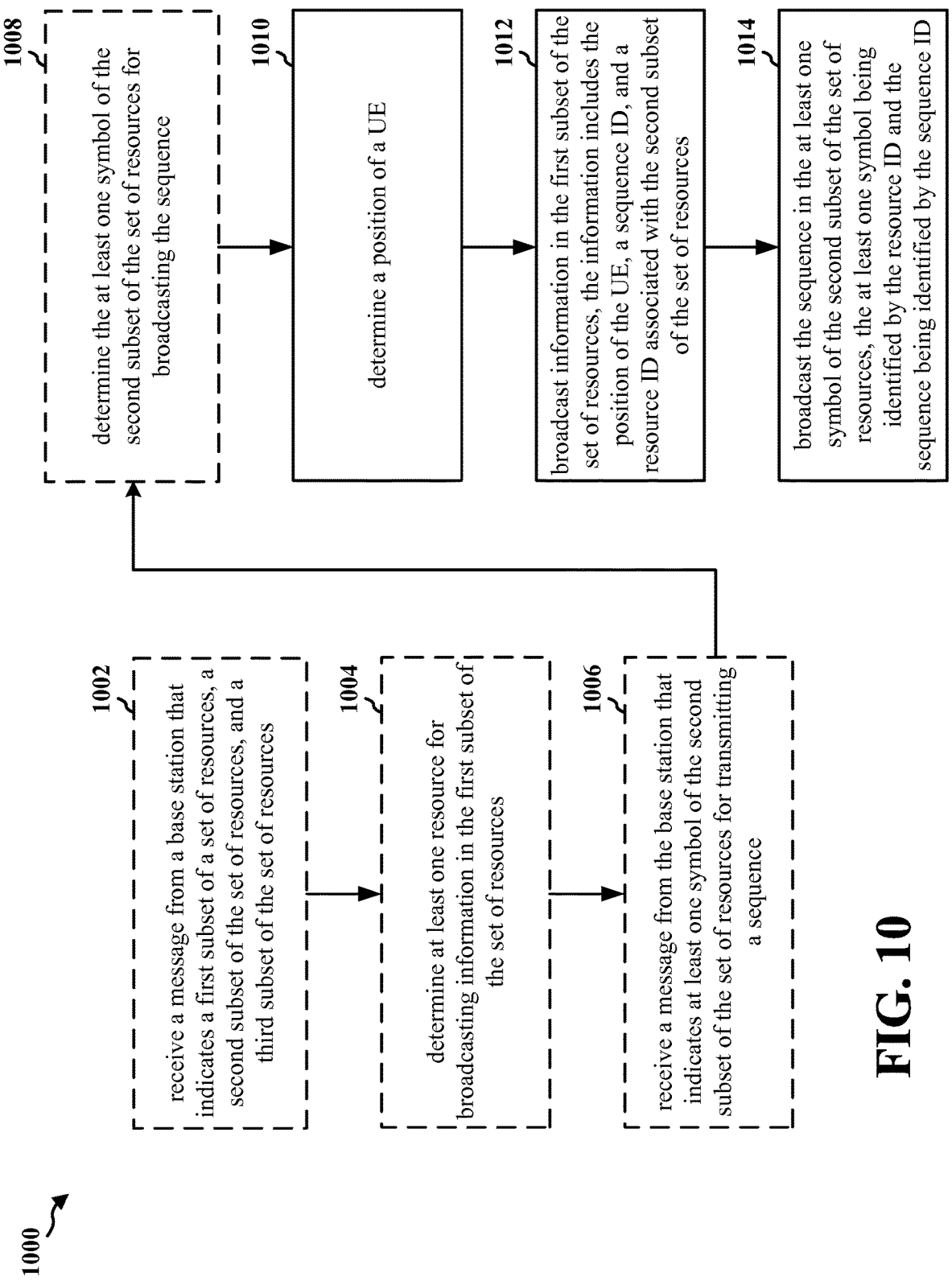
FIG. 10 is a flowchart of a method of wireless communication.

FIG. 10 is a flowchart 1000 of a method of wireless communication. The method may be performed by a UE (e.g., the UE 904, the apparatus 1302/1302'). At 1002, the UE may receive a message from a base station that indicates a first subset of a set of resources, a second subset of the set of resources, and a third subset of the set of resources. For example, referring to FIG. 9A, the UE may be the UE 904. The UE 904 may receive a message from the base station 902 that indicates a first subset of the set of resources 950 (e.g., resources in stage 1), a second subset of the set of resources 950 (e.g., resources in stage 2), and a third subset of the set of resources 950 (e.g., resources in stage 3).

At 1004, the UE may determine at least one resource for broadcasting information in the first subset of the set of resources. For example, referring to FIG. 9A, the UE 904 may determine at least one resource (e.g., the resource 960) for broadcasting information in the first subset of the set of resources 950. In an aspect, the at least one resource may be determined autonomously by determining the resources available in the first subset of the set of resources 950 and by selecting at least one resource using random selection or energy-based detection. In another aspect, the at least one resource may be indicated or allocated to the UE 904 by the base station 902 in the message at 1002 or in a different message from the base station 902.

At 1006, the UE may receive a message from the base station that indicates at least one symbol of the second subset of the set of resources for transmitting a sequence. For example, referring to FIG. 9A, the UE 904 may receive a message from the base station 902 indicating at least one symbol of the second subset of the set of resources 950 for transmitting a sequence.

At 1008, the UE may determine the at least one symbol of the second subset of the set of resources for broadcasting the sequence. For example, referring to FIG. 9A, the UE 904 may determine the at least one symbol of the second subset of the set of resources for broadcasting the sequence. In an aspect, the UE 904 may select the at least one symbol (e.g., the symbol 970) based on the message at 1006. However, if the UE 904 did not receive a message from the base station 902 indicating the at least one symbol to use for transmitting the sequence, then the UE 904 may determine the at least one symbol autonomously (e.g., using random selection or energy-based detection) by determining the available symbols in the second subset of the set of resources 950 and by selecting at least one symbol using random selection or energy-based detection.

At 1010, the UE may determine a position of a UE. For example, referring to FIG. 9A, the UE 904 may determine the position of the UE 904. In an aspect, the UE 904 may determine the position of the UE 904 based on GPS technology. In this aspect, the UE 904 may receive positioning information broadcasted by satellites and calculates its position based on the received positioning information. In another aspect, the UE 904 may be in a fixed position and the position may be preconfigured in the UE 904.

At 1012, the UE may broadcast information in the first subset of the set of resources, and the information may include the position of the UE, a sequence ID, and a resource ID associated with the second subset of the set of resources. For example, referring to FIG. 9A, the UE 904 may broadcast information in the first subset of the set of resources, and the information may include the position of the UE 904, a sequence ID, and a resource ID associated with the second subset of the set of resources 950.

At 1014, the UE may broadcast the sequence in the at least one symbol of the second subset of the set of resources, and the at least one symbol may be identified by the resource ID and the sequence may be identified by the sequence ID. For example, referring to FIG. 9A, the UE 904 may broadcast the sequence in the at least one symbol of the second subset of the set of resources 950. The at least one symbol may be identified by the resource ID, and the sequence may be identified by the sequence ID. For example, the sequence may be a Zadoff Chu sequence, and the sequence ID may correspond to the root index and the cyclic shift of the Zadoff Chu sequence. In an aspect, the sequence may occupy entire bandwidth of the at least one symbol.

Figure 11:
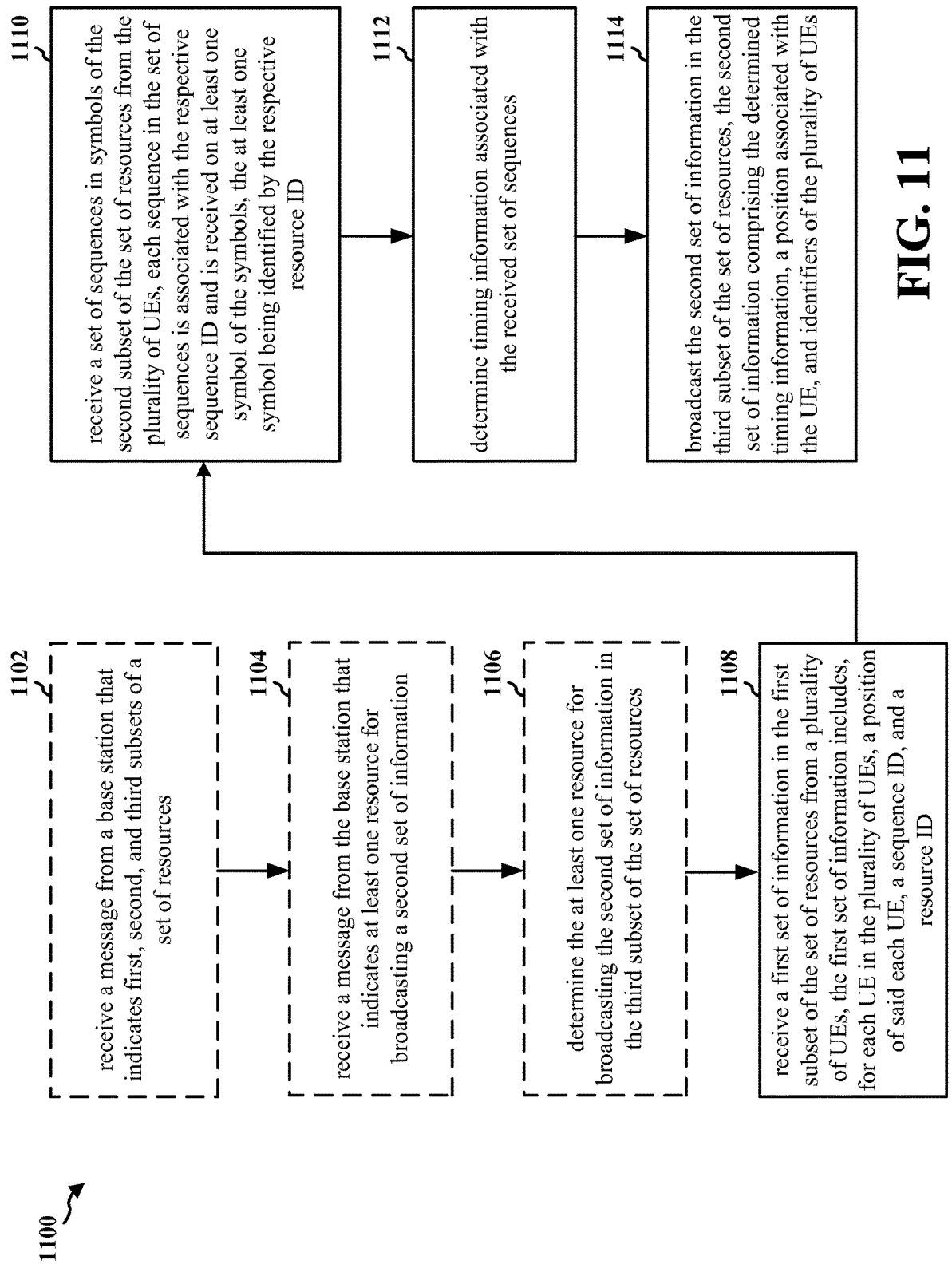
FIG. 11 is a flowchart of a method of wireless communication.

FIG. 11 is a flowchart 1100 of a method of wireless communication. The method may be performed by a UE (e.g., the UE 912, the apparatus 1502/1502'). At 1102, the UE receive a message from a base station that indicates first, second, and third subsets of a set of resources. For example, referring to FIG. 9A, the UE 912 may receive a message from the base station 902 that indicates the first subset, the second subset, and the third subset of the set of resources 950.

At 1104, the UE may receive a message from the base station that indicates at least one resource for broadcasting a second set of information. For example, referring to FIG. 9A, the UE 912 may receive a message from the base station that indicates at least one resource (e.g., the resource 980) for broadcasting the second set of information. In an aspect, the message at 1104 may be the same message as, or a different message from, the message in 1102.

At 1106, the UE may determine the at least one resource for broadcasting the second set of information in the third subset of the set of resources. For example, the UE 912 may determine the at least one resource (e.g., the resource 980) for broadcasting the second set of information in the third subset of the set of resources 950. In an aspect, if the UE 912 receives the message from the base station 902 indicating the least one resource for broadcasting the second set of information, then the UE 912 may determine the at least one resource for broadcasting the second set of information based on the received message from the base station 902. However, if the UE 912 does not receive a message from the base station 902 indicating the at least one resource for broadcasting the second set of information, then the UE 912 may determine the at least one resource autonomously (e.g., random selection or energy-based detection) by determining the available resources in the third subset of the set of resources 950 and by selecting one or more available resources based on random selection or energy-based detection.

At 1108, the UE may receive a first set of information in the first subset of the set of resources from a plurality of UEs. The first set of information may include, for each UE in the plurality of UEs, a position of said each UE, a sequence ID, and a resource ID. For example, referring to FIG. 9A, the UE 912 may receive a first set of information in the first subset of the set of resources 950 from the UEs 904, 906, 908, 910. The first set of information may include, for each of the UEs 904, 906, 908, 910, a position of each respective UE, a sequence ID associated with each respective UE, and a resource ID associated with each respective UE.

At 1110, the UE may receive a set of sequences in symbols of the second subset of the set of resources from the plurality of UEs. Each sequence in the set of sequences may be associated with the respective sequence ID and may be received on at least one symbol of the symbols. The at least one symbol may be identified by the respective resource ID. For example, referring to FIG. 9A, the UE 912 may receive a set of sequences in one or more symbols of the second subset of the set of resources 950 from the UEs 904, 906, 908, 910. Each sequence in the set of sequences may be associated with a respective sequence ID indicated in the received first set of information and may be received on at least one symbol of the symbols. The at least one symbol may be identified by the respective resource ID as indicated in the received first set of information. In an aspect, the set of sequences may include Zadoff Chu sequences, and each respective sequence ID may include a root index and a cyclic shift associated with each respective Zadoff Chu sequence. In another aspect, each sequence in the set of sequences may occupy an entire bandwidth of the at least one symbol on which the sequence was transmitted.

At 1112, the UE may determine timing information associated with the received set of sequences. For example, referring to FIG. 9A, the UE 912 may determine timing information associated with the received set of sequences. The timing information may include a time of arrival of the each sequence in the set of sequences. The timing information may include a time difference of arrival associated with the sequences in the set of sequences. The timing information may include the time sent for each sequence in the set of sequences.

At 1114, the UE may broadcast the second set of information in the third subset of the set of resources. The second set of information may include the determined timing information, a position associated with the UE, and identifiers of the plurality of UEs. For example, referring to FIG. 9A, the UE 912 may broadcast the second set of information in the third subset of the set of resources 950. The second set of information may be broadcasted in the determined at least one resource for broadcasting the second set of information. The second set of information may include the determined timing information, the position associated with the UE 912, and identifiers of the UEs 904, 906, 908, 910.

Figure 12:
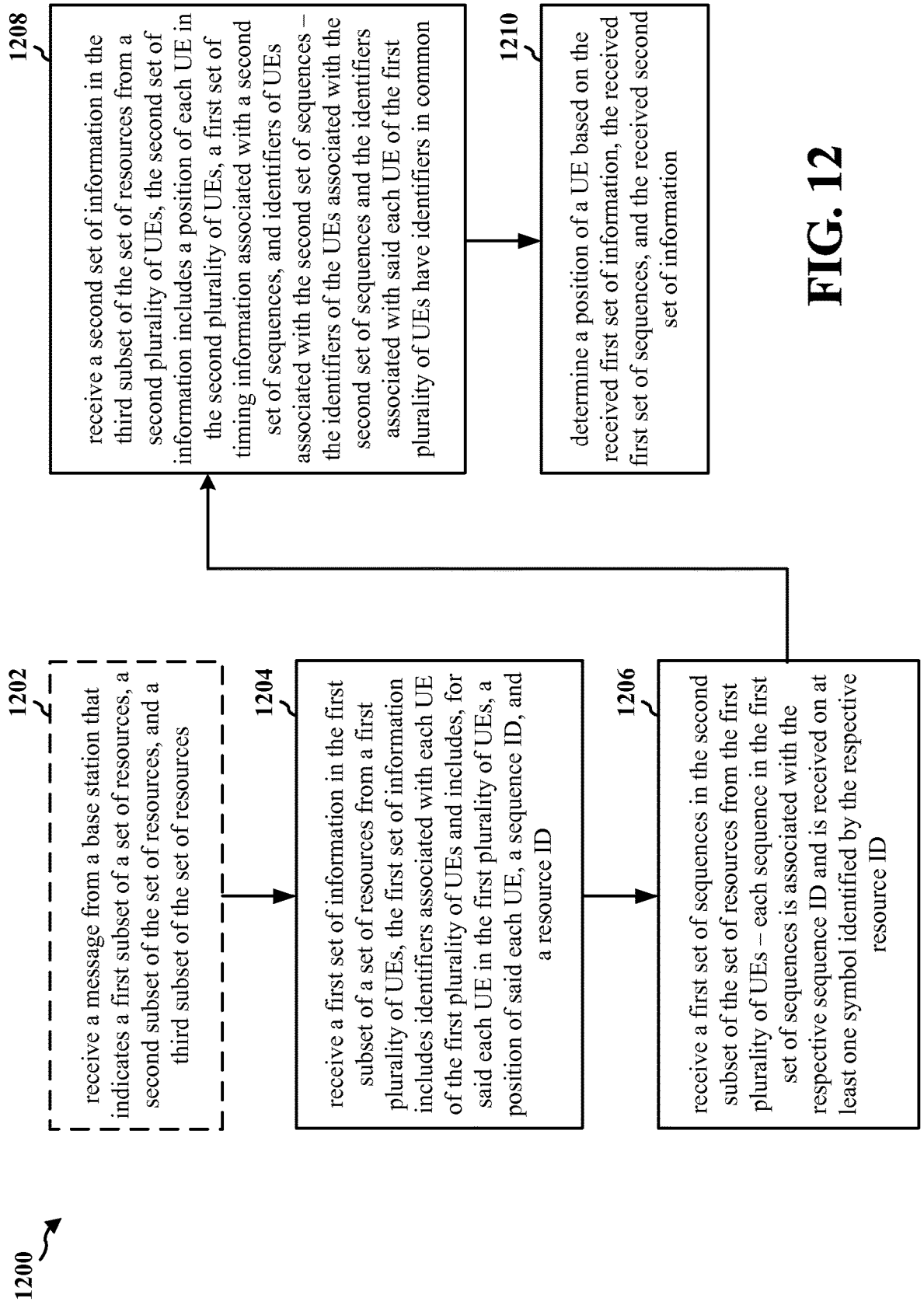
FIG. 12 is a flowchart of a method of wireless communication.

FIG. 12 is a flowchart 1200 of a method of wireless communication. The method may be performed by a UE (e.g., the UE 914, the apparatus 1702/1702'). At 1202, the UE may receive a message from a base station that indicates a first subset of a set of resources, a second subset of the set of resources, and a third subset of the set of resources. In an aspect, the first subset of the set of resources, the second subset of the set of resources, and the third subset of the set of resources occur periodically. For example, referring to FIG. 9A, the UE 914 may receive a message from the base station 902 that indicates the first, second, and third subsets of the set of resources 950.

At 1204, the UE may receive a first set of information in the first subset of a set of resources from a first plurality of UEs, the first set of information includes identifiers associated with each UE of the first plurality of UEs and includes, for said each UE in the first plurality of UEs, a position of said each UE, a sequence ID, and a resource ID. For example, the UE 914 may receive a first set of information in the first subset of the set of resources 950 from the UEs 904, 906, 908, 910. The first set of information may include identifiers associated with each of the UEs 904, 906, 908, 910. The first set of information may include, for each of the UEs 904, 906, 908, 910, a position of each respective UE, a sequence ID, and a resource ID.

At 1206, the UE may receive a first set of sequences in the second subset of the set of resources from the first plurality of UEs. Each sequence in the first set of sequences may be associated with the respective sequence ID and may be received on at least one symbol identified by the respective resource ID. In an aspect, the first set of sequences may include Zadoff Chu sequences, and each of the sequence IDs may include a root index and a cyclic shift associated with the respective Zadoff Chu sequence. In another aspect, each sequence of the first set of sequences may occupy an entire bandwidth of the at least one symbol on which the respective sequence was received. For example, referring to FIG. 9A, the UE 914 may receive the first set of sequences in the second subset of the set of resources from the UEs 904, 906, 908, 910. Each sequence in the first set of sequences may be associated with a respective sequence ID indicated in the first set of information. Each sequence in the first set of sequences may be received on at least one symbol identified by the respective resource ID indicated in the first set of information.

At 1208, the UE may receive a second set of information in the third subset of the set of resources from a second plurality of UEs. The second set of information may include a position of each UE in the second plurality of UEs, a first set of timing information associated with a second set of sequences, and identifiers of UEs associated with the second set of sequences. The identifiers of the UEs associated with the second set of sequences and the identifiers associated with said each UE of the first plurality of UEs may have identifiers in common. For example, referring to FIG. 9A, the UE 914 may receive the second set of information in the third subset of the set of resources (e.g., the resource 980) from the UE 912. The second set of information includes the position of the UE 912. The second set of information includes a first set of timing information associated with the second set of sequences. In an aspect, the second set of sequences may be the same as the first set of sequences, or the second set of sequences may be partially different from the first set of sequences. The second set of information may include the identifiers associated with the UEs 904, 906, 908, 910. In this example, the identifiers of the UEs 904, 906, 908, 910 associated with the second set of sequences are the same as the identifiers associated with each UE of the first plurality of UEs.

At 1210, the UE may determine a position of the UE based on the received first set of information, the received first set of sequences, and the received second set of information. In an aspect, the UE may determine the position of the UE by determining a second set of timing information based on the first set of sequences and by determining the position of the UE based on the first subset of the first set of timing information and the second subset of the second set of timing information. In an aspect, the first set of timing information and the second set of timing information may not all be associated with the same UEs. For example, the UE 914 may be close enough to receive sequences from some UEs, whereas the UE 912 may be further away and receive only a subset of the sequences that the UE 914 received, and vice versa. In this aspect, the first subset of the first set of timing information and the second subset of the second set of timing information may be chosen such that both subsets are associated with the same UEs of the first reference UE type. In another aspect, if the first and second sets of timing information are associated with the same UEs, then the first subset of the first set of timing information may include the entire first set of timing information and the second subset of the second set of timing information may include the entire second set of timing information. For example, referring to FIG. 9A, assume the UEs 912, 914 both receive sequences from the UEs 904, 906, 908, 910. The UE 914 may determine the position of the UE 914 based on the received first set of information, the received first set of sequences, and the received second set of information. The UE 914 may determine the double difference based on Eqs. 18-20 and solve for the x and y position of the UE 914.

Figure 13:
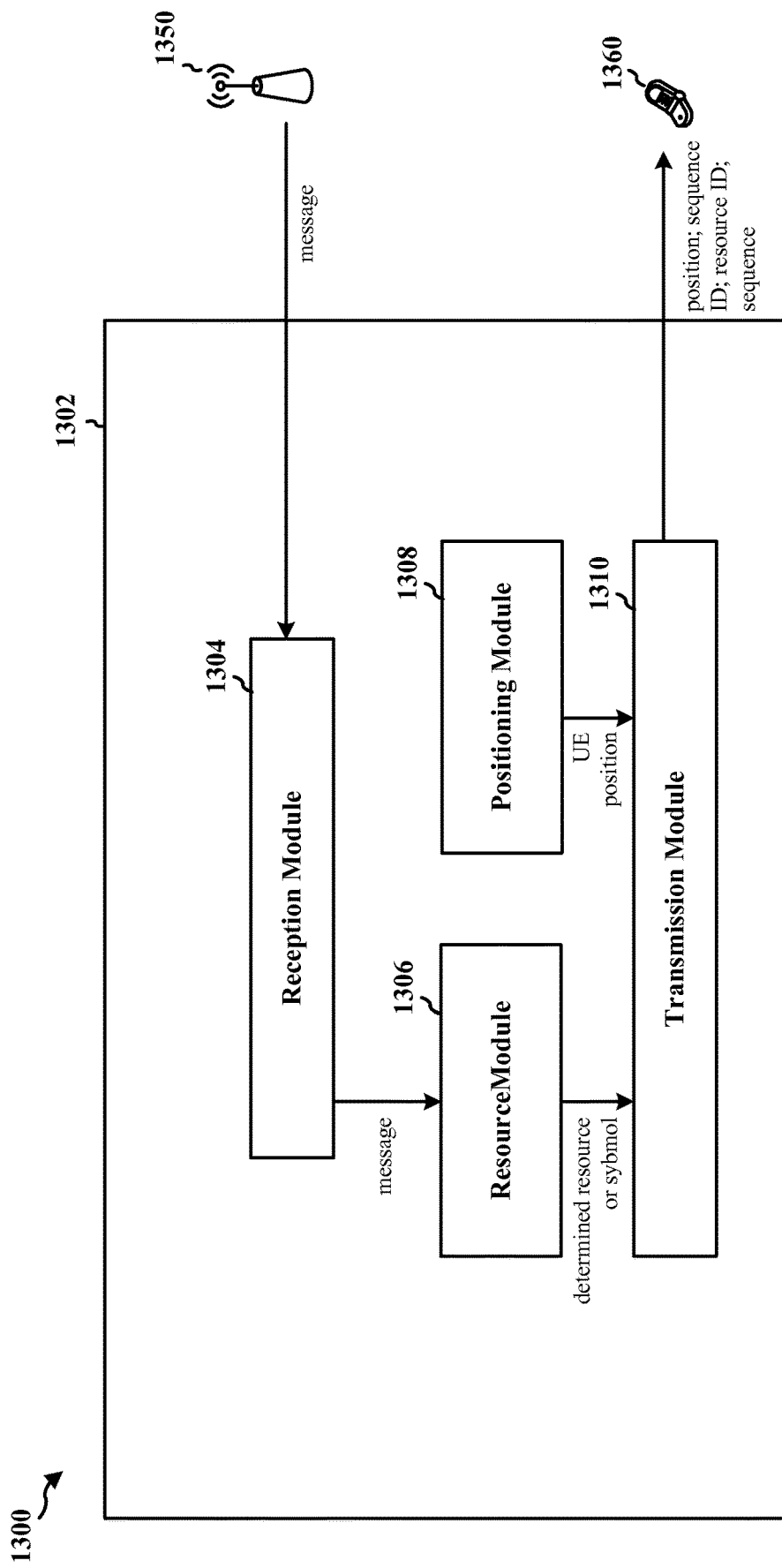
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be UE. The apparatus may include a reception module 1304, a resource module 1306, a positioning module 1308, and a transmission module 1310. The positioning module 1308 may determine a position of the apparatus. The transmission module 1310 may broadcast information in a first subset of a set of resources (e.g., to a UE 1360). The information may include the position of the apparatus, a sequence ID, and a resource ID associated with a second subset of the set of resources. The transmission module 1310 may broadcast a sequence in at least one symbol of the second subset of the set of resources. The at least one symbol may be identified by the resource ID and the sequence may be identified by the sequence ID. In an aspect, the sequence may be a Zadoff Chu sequence, and the sequence ID may include a root index and a cyclic shift associated with the Zadoff Chu sequence. In another aspect, the sequence may occupy an entire bandwidth of the at least one symbol. In one configuration, the reception module 1304 may receive a message from a base station 1350 that indicates the first subset of the set of resources, the second subset of the set of resources, and a third subset of the set of resources. In another configuration, the resource module 1306 may determine at least one resource for broadcasting the information in the first subset of the set of resources. In another configuration, the resource module 1306 may determine the at least one symbol of the second subset of the set of resources for broadcasting the sequence. In an aspect, the determination may be based on a random selection or an energy-based detection. In another configuration, the resource module 1306 may be configured to receive a message from the base station 1350 that indicates the at least one symbol of the second subset of the set of resources for transmitting the sequence. In this configuration, the determination of the at least one symbol may be based on the received message.

The apparatus may include additional modules that perform each of the blocks of the algorithm in the aforementioned flowcharts of FIG. 10. As such, each block in the aforementioned flowcharts of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
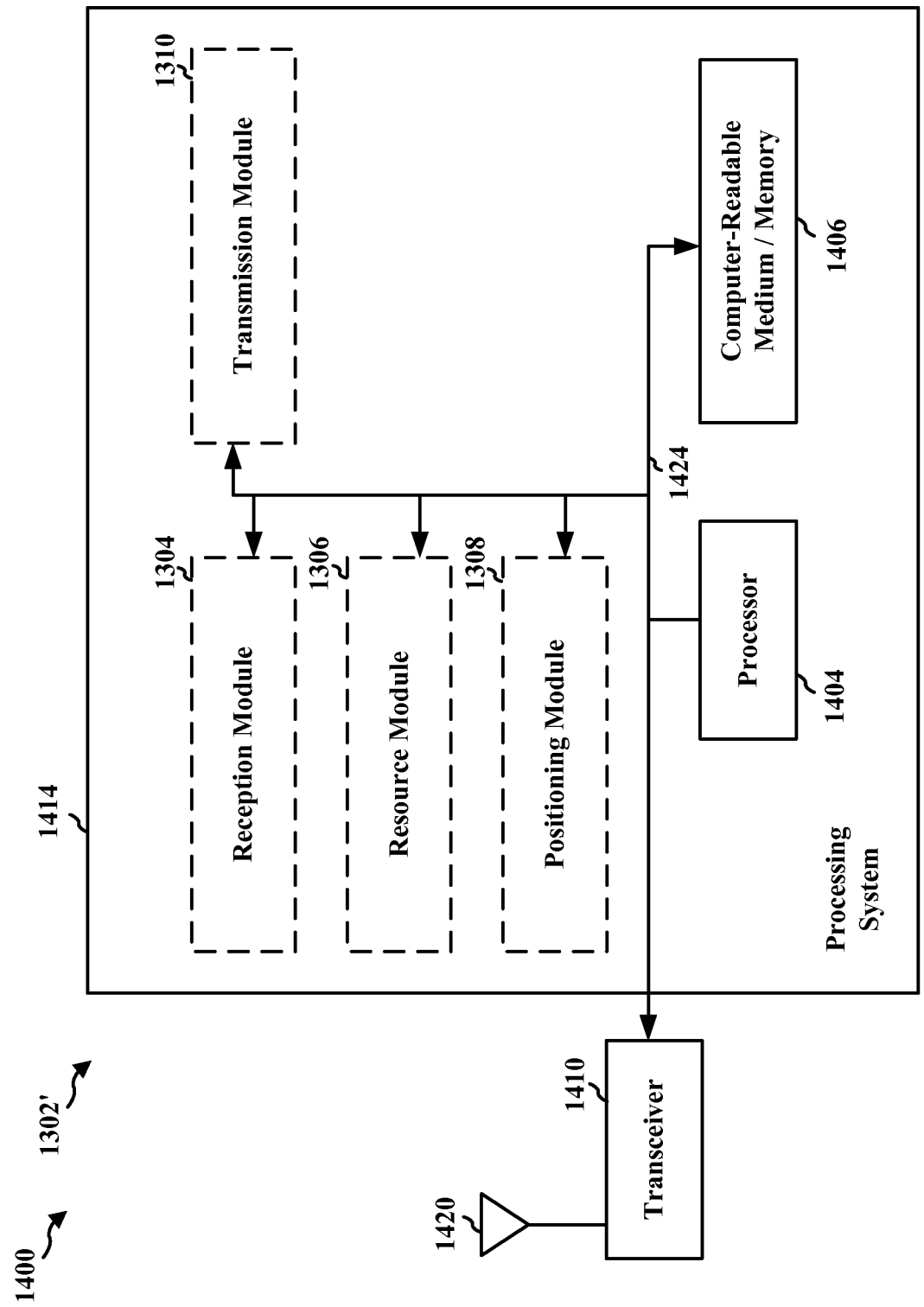
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception module 1304. In addition, the transceiver 1410 receives information from the processing system 1414, specifically the transmission module 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308, 1310. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for determining a position of the apparatus. The apparatus includes means for broadcasting information in a first subset of a set of resources. The information may include the position of the apparatus, a sequence ID, and a resource ID associated with a second subset of the set of resources. The apparatus includes means for broadcasting a sequence in at least one symbol of the second subset of the set of resources. The at least one symbol may be identified by the resource ID and the sequence may be identified by the sequence ID. In an aspect, the sequence may be a Zadoff Chu sequence, and the sequence ID may include a root index and a cyclic shift associated with the Zadoff Chu sequence. In another aspect, the sequence may occupy an entire bandwidth of the at least one symbol. In one configuration, the apparatus may include means for receiving a message from a base station that indicates the first subset of the set of resources, the second subset of the set of resources, and a third subset of the set of resources. In another configuration, the apparatus may include means for determining at least one resource for broadcasting the information in the first subset of the set of resources. In another configuration, the apparatus may include means for determining the at least one symbol of the second subset of the set of resources for broadcasting the sequence. In an aspect, the determination may be based on a random selection or an energy-based detection. In another configuration, the apparatus may include means for receiving a message from a base station that indicates the at least one symbol of the second subset of the set of resources for transmitting the sequence. In this configuration, the determination of the at least one symbol may be based on the received message. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 15:
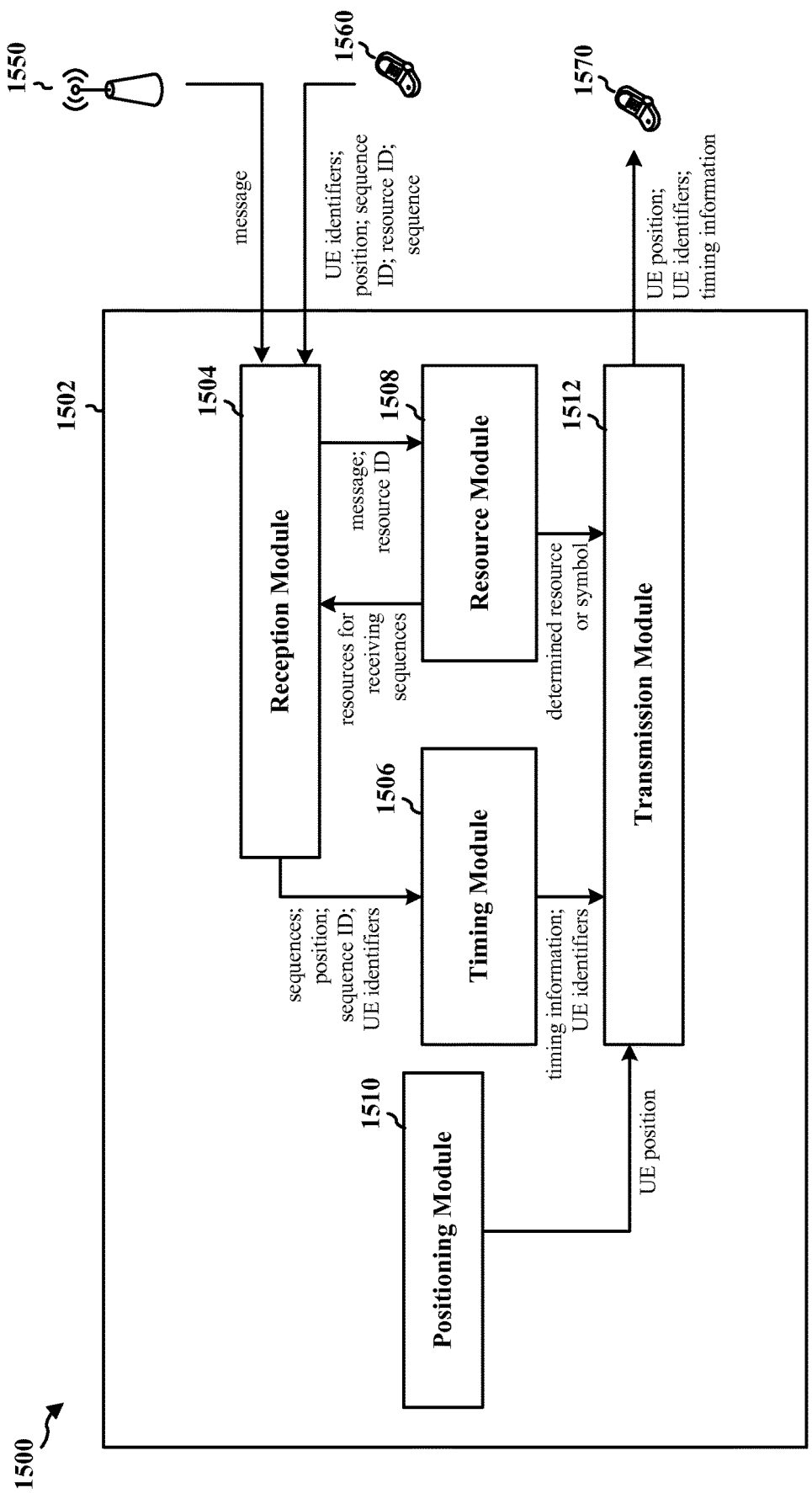
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a UE. The apparatus may include a reception module 1504, a timing module 1506, a resource module 1508, a positioning module 1510, and a transmission module 1512. The reception module 1504 may be configured to receive a first set of information in a first subset of a set of resources from a plurality of UEs (e.g., a UE 1560 and other UEs of the first reference UE type). The first set of information may include, for each UE in the plurality of UEs, a position of said each UE, a sequence ID, and a resource ID. The reception module 1504 may be configured to receive a set of sequences in symbols of a second subset of the set of resources from the plurality of UEs. Each sequence in the set of sequences may be associated with the respective sequence ID and may be received on at least one symbol of the symbols. The at least one symbol may be identified by the respective resource ID. The timing module 1506 may be configured to determining timing information associated with the received set of sequences. The transmission module 1512 may be configured to broadcast a second set of information in a third subset of the set of resources (e.g., to a UE 1570 or to other UEs of the second set of UEs). The second set of information may include the determined timing information, a position associated with the apparatus, and identifiers of the plurality of UEs. In an aspect, the set of sequences include Zadoff Chu sequences, and the respective sequence ID includes a root index and a cyclic shift associated with a Zadoff Chu sequence. In another aspect, each sequence of the set of sequences may occupy an entire bandwidth of the at least one symbol. In another configuration, the reception module 1504 may be configured to receive a message from a base station 1550 that indicates the first, second, and third subsets of the set of resources. In another configuration, the resource module 1508 may be configured to determine at least one resource for broadcasting the second set of information in the third subset of the set of resources. In an aspect, the determination may be based on a random selection or an energy-based detection. In another configuration, the reception module 1504 may be configured to receive a message from the base station 1550 that indicates the at least one resource for broadcasting the second set of information. In this configuration, the determination of the at least one resource may be based on the received message.

The apparatus may include additional modules that perform each of the blocks of the algorithm in the aforementioned flowcharts of FIG. 11. As such, each block in the aforementioned flowcharts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
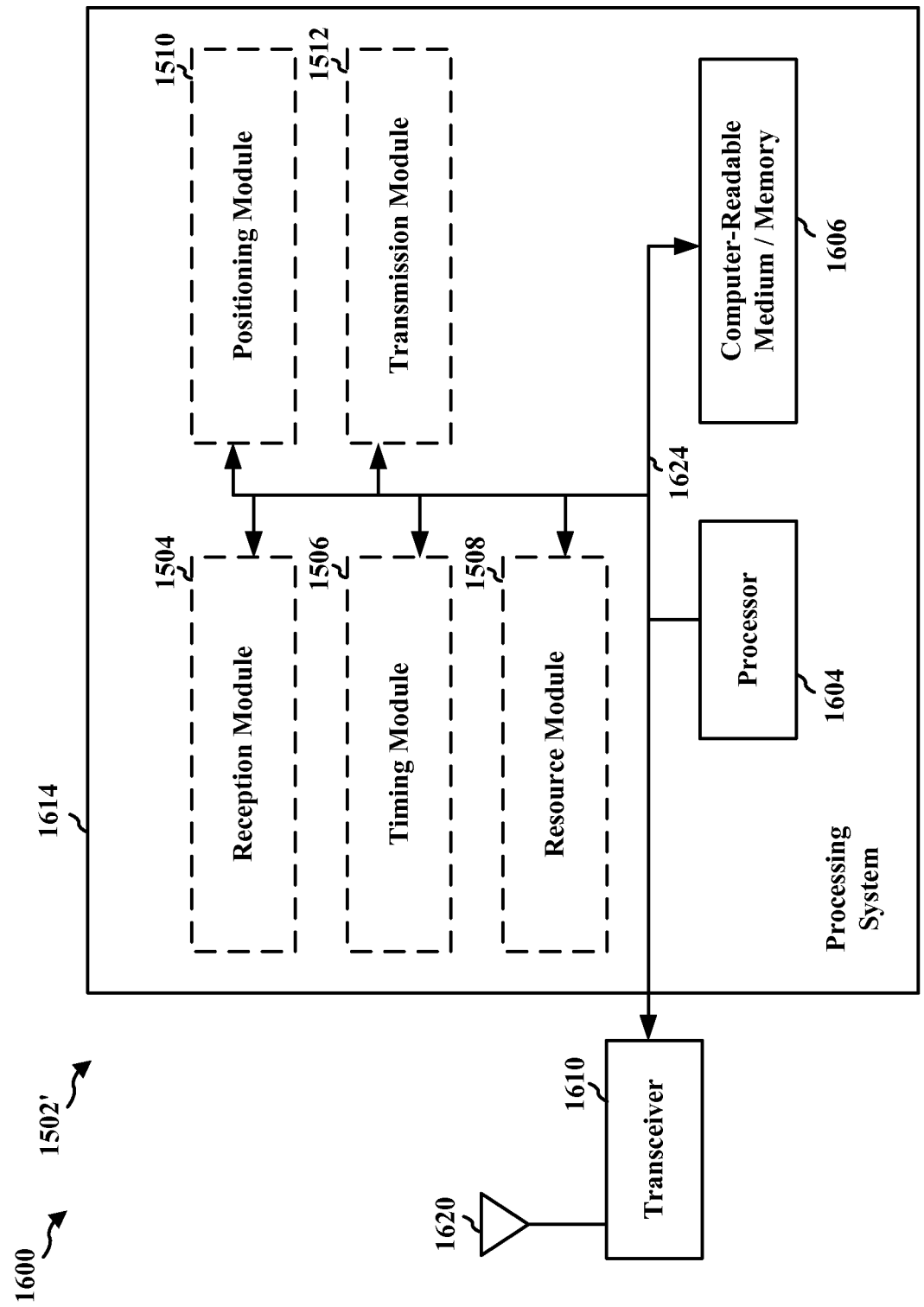
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception module 1504. In addition, the transceiver 1610 receives information from the processing system 1614, specifically the transmission module 1512, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system further includes at least one of the modules 1504, 1506, 1508, 1510, 1512. The modules may be software modules running in the processor 1604, resident/stored in the computer readable medium/memory 1606, one or more hardware modules coupled to the processor 1604, or some combination thereof. The processing system 1614 may be a component of the UE 650 and may include the memory 660 and/or at least one of the TX processor 668, the RX processor 656, and the controller/processor 659.

In one configuration, the apparatus 1502/1502' for wireless communication includes means for receiving a first set of information in a first subset of a set of resources from a plurality of UEs. The first set of information may include, for each UE in the plurality of UEs, a position of said each UE, a sequence ID, and a resource ID. The apparatus includes means for receiving a set of sequences in symbols of a second subset of the set of resources from the plurality of UEs. Each sequence in the set of sequences may be associated with the respective sequence ID and may be received on at least one symbol of the symbols. The at least one symbol may be identified by the respective resource ID. The apparatus includes means for determining timing information associated with the received set of sequences. The apparatus includes means for broadcasting a second set of information in a third subset of the set of resources. The second set of information may include the determined timing information, a position associated with the apparatus, and identifiers of the plurality of UEs. In an aspect, the set of sequences may include Zadoff Chu sequences, and the respective sequence ID may include a root index and a cyclic shift associated with a Zadoff Chu sequence. In another aspect, each sequence of the set of sequences may occupy an entire bandwidth of the at least one symbol. In another configuration, the apparatus may include means for receiving a message from a base station that indicates the first, second, and third subsets of the set of resources. In another configuration, the apparatus may include means for determining at least one resource for broadcasting the second set of information in the third subset of the set of resources. In an aspect, the determination may be based on a random selection or an energy-based detection. In another configuration, the apparatus may include means for receiving a message from a base station that indicates the at least one resource for broadcasting the second set of information. In this configuration, the determination of the at least one resource may be based on the received message. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 17:
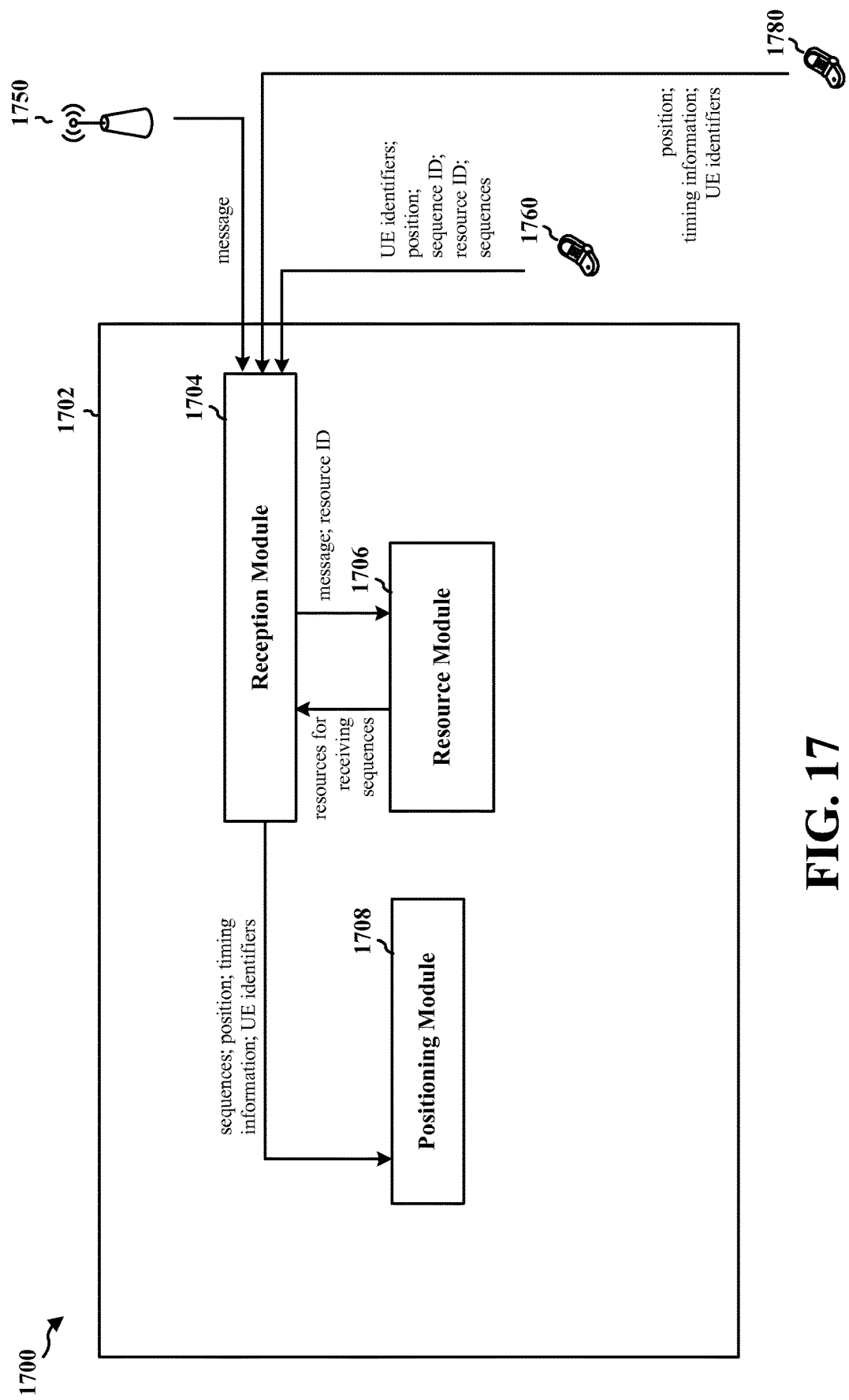
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a UE. The apparatus may include a reception module 1704, a resource module 1706, and a positioning module 1708. The reception module 1704 may be configured to receive a first set of information in a first subset of a set of resources from a first plurality of UEs (e.g., a UE 1760 and other UEs of the first reference UE type). The first set of information may include identifiers associated with each UE of the first plurality of UEs. The first set of information may further include, for said each UE in the first plurality of UEs, a position of said each UE, a sequence ID, and a resource ID. The reception module 1704 may be configured to receive a first set of sequences in a second subset of the set of resources from the first plurality of UEs. Each sequence in the first set of sequences may be associated with the respective sequence ID and may be received on at least one symbol identified by the respective resource ID. The reception module 1704 may be configured to receiving a second set of information in a third subset of the set of resources from a second plurality of UEs (e.g., a UE 1780 and other UEs of the second reference UE type). The second set of information may include a position of each UE in the second plurality of UEs, a first set of timing information associated with a second set of sequences, and identifiers of UEs associated with the second set of sequences. The identifiers of the UEs associated with the second set of sequences and the identifiers associated with said each UE of the first plurality of UEs may have identifiers in common. The positioning module 1708 may be configured to determine a position of the apparatus based on the received first set of information, the received first set of sequences, and the received second set of information. In an aspect, he first set of sequences may include Zadoff Chu sequences, and each of the sequence IDs may include a root index and a cyclic shift associated with a Zadoff Chu sequence. In another aspect, each sequence of the first set of sequences may occupy an entire bandwidth of the at least one symbol. In another configuration, the reception module 1704 may be configured to receive a message from a base station 1750 that indicates the first subset of the set of resources, the second subset of the set of resources, and the third subset of the set of resources. In an aspect, the first subset of the set of resources, the second subset of the set of resources, and the third subset of the set of resources may occur periodically. In another aspect, the positioning module 1708 may be configured to determine the position of the apparatus by determining a second set of timing information based on the received first set of sequences and by determining the position of the apparatus based on a first subset of the first set of timing information and a second subset of the second set of timing information.

The apparatus may include additional modules that perform each of the blocks of the algorithm in the aforementioned flowcharts of FIG. 12. As such, each block in the aforementioned flowcharts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
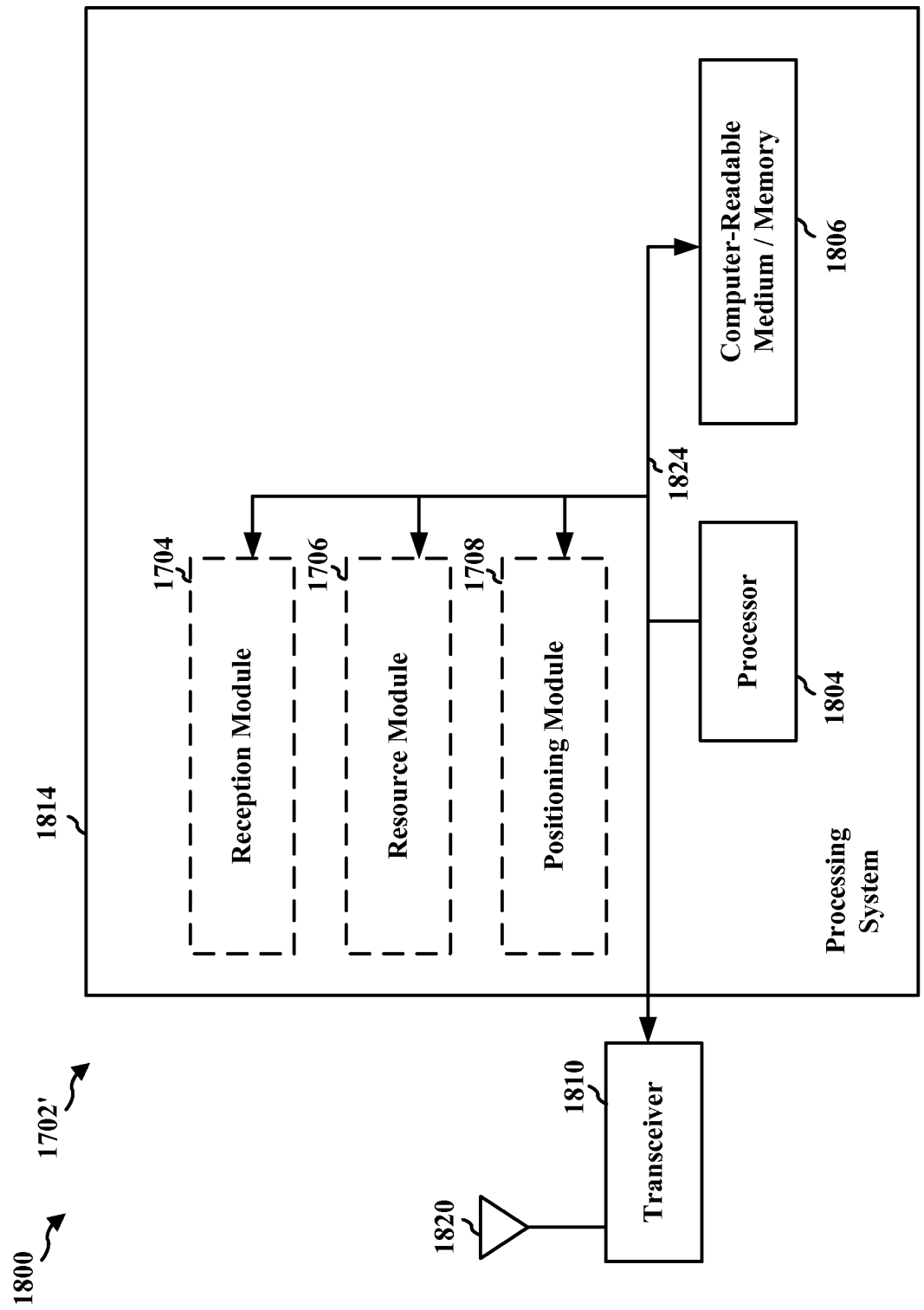
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception module 1704. In addition, the transceiver 1810 receives information from the processing system 1814, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, and 1708. The modules may be software modules running in the processor 1804, resident/stored in the computer readable medium/memory 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for receiving a first set of information in a first subset of a set of resources from a first plurality of UEs. The first set of information may include identifiers associated with each UE of the first plurality of UEs and may include, for said each UE in the first plurality of UEs, a position of said each UE, a sequence ID, and a resource ID. The apparatus includes means for receiving a first set of sequences in a second subset of the set of resources from the first plurality of UEs. Each sequence in the first set of sequences may be associated with the respective sequence ID and may be received on at least one symbol identified by the respective resource ID. The apparatus includes means for receiving a second set of information in a third subset of the set of resources from a second plurality of UEs. The second set of information may include a position of each UE in the second plurality of UEs, a first set of timing information associated with a second set of sequences, and identifiers of UEs associated with the second set of sequences. The identifiers of the UEs associated with the second set of sequences and the identifiers associated with said each UE of the first plurality of UEs may have identifiers in common. The apparatus includes means for determining a position of the apparatus based on the received first set of information, the received first set of sequences, and the received second set of information. In an aspect, the first set of sequences may include Zadoff Chu sequences, and each of the sequence IDs may include a root index and a cyclic shift associated with a Zadoff Chu sequence. In another aspect, each sequence of the first set of sequences may occupy an entire bandwidth of the at least one symbol. In one configuration, the apparatus may include means for receiving a message from a base station that indicates the first subset of the set of resources, the second subset of the set of resources, and the third subset of the set of resources. In an aspect, the first subset of the set of resources, the second subset of the set of resources, and the third subset of the set of resources may occur periodically. In another configuration, the means for determining the position of the UE may be configured to determine the position by determining a second set of timing information based on the received first set of sequences and by determining the position of the apparatus based on a first subset of the first set of timing information and a second subset of the second set of timing information. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
   receiving a first set of information in a first subset of a set of resources from a plurality of UEs, the first set of information comprising, for each UE in the plurality of UEs, a position of said each UE, a sequence identifier (ID), and a resource ID;
   receiving a set of sequences in symbols of a second subset of the set of resources from the plurality of UEs, wherein each sequence in the set of sequences is associated with the respective sequence ID and is received on at least one symbol of the symbols, the at least one symbol being identified by the respective resource ID;
   determining timing information associated with the received set of sequences; and
   broadcasting a second set of information in a third subset of the set of resources, the second set of information comprising the determined timing information, a position associated with the UE, and identifiers of the plurality of UEs.

2. The method of claim 1, wherein the set of sequences include Zadoff Chu sequences, and the respective sequence ID comprises a root index and a cyclic shift associated with a Zadoff Chu sequence.

3. The method of claim 1, wherein each sequence of the set of sequences occupies an entire bandwidth of the at least one symbol.

4. The method of claim 1, further comprising receiving a message from a base station that indicates the first, second, and third subsets of the set of resources.

5. The method of claim 1, further comprising determining at least one resource for broadcasting the second set of information in the third subset of the set of resources.

6. The method of claim 5, wherein the determination is based on a random selection or an energy-based detection.

7. The method of claim 5, further comprising receiving a message from a base station that indicates the at least one resource for broadcasting the second set of information, wherein the determination of the at least one resource is based on the received message.

8. An apparatus for wireless communication, the apparatus being a user equipment (UE) and comprising:
   a memory; and
   at least one processor coupled to the memory and configured to:
      receive a first set of information in a first subset of a set of resources from a plurality of UEs, the first set of information comprising, for each UE in the plurality of UEs, a position of said each UE, a sequence identifier (ID), and a resource ID;
      receive a set of sequences in symbols of a second subset of the set of resources from the plurality of UEs, wherein each sequence in the set of sequences is associated with the respective sequence ID and is received on at least one symbol of the symbols, the at least one symbol being identified by the respective resource ID;
      determine timing information associated with the received set of sequences; and
      broadcast a second set of information in a third subset of the set of resources, the second set of information comprising the determined timing information, a position associated with the UE, and identifiers of the plurality of UEs.

9. The apparatus of claim 8, wherein the set of sequences include Zadoff Chu sequences, and the respective sequence ID comprises a root index and a cyclic shift associated with a Zadoff Chu sequence.

10. The apparatus of claim 8, wherein each sequence of the set of sequences occupies an entire bandwidth of the at least one symbol.

11. The apparatus of claim 8, wherein the at least one processor is further configured to receive a message from a base station that indicates the first, second, and third subsets of the set of resources.

12. The apparatus of claim 8, wherein the at least one processor is further configured to determine at least one resource for broadcasting the second set of information in the third subset of the set of resources.

13. The apparatus of claim 12, wherein the determination is based on a random selection or an energy-based detection.

14. The apparatus of claim 12, wherein the at least one processor is further configured to receive a message from a base station that indicates the at least one resource for broadcasting the second set of information, wherein the determination of the at least one resource is based on the received message.

15. An apparatus for wireless communication, the apparatus being a user equipment (UE) and comprising:
   means for receiving a first set of information in a first subset of a set of resources from a plurality of UEs, the first set of information comprising, for each UE in the plurality of UEs, a position of said each UE, a sequence identifier (ID), and a resource ID;
   means for receiving a set of sequences in symbols of a second subset of the set of resources from the plurality of UEs, wherein each sequence in the set of sequences is associated with the respective sequence ID and is received on at least one symbol of the symbols, the at least one symbol being identified by the respective resource ID;
   means for determining timing information associated with the received set of sequences; and
   means for broadcasting a second set of information in a third subset of the set of resources, the second set of information comprising the determined timing information, a position associated with the UE, and identifiers of the plurality of UEs.

16. The apparatus of claim 15, wherein the set of sequences include Zadoff Chu sequences, and the respective sequence ID comprises a root index and a cyclic shift associated with a Zadoff Chu sequence.

17. The apparatus of claim 15, wherein each sequence of the set of sequences occupies an entire bandwidth of the at least one symbol.

18. The apparatus of claim 15, further comprising means for receiving a message from a base station that indicates the first, second, and third subsets of the set of resources.

19. The apparatus of claim 15, further comprising means for determining at least one resource for broadcasting the second set of information in the third subset of the set of resources.

20. The apparatus of claim 19, wherein the determination is based on a random selection or an energy-based detection.

21. The apparatus of claim 19, further comprising means for receiving a message from a base station that indicates the at least one resource for broadcasting the second set of information, wherein the determination of the at least one resource is based on the received message.

22. A non-transitory computer-readable medium storing computer executable code, the computer executable code having instructions for:
receiving a first set of information in a first subset of a set of resources from a plurality of UEs, the first set of information comprising, for each UE in the plurality of UEs, a position of said each UE, a sequence identifier (ID), and a resource ID;
receiving a set of sequences in symbols of a second subset of the set of resources from the plurality of UEs, wherein each sequence in the set of sequences is associated with the respective sequence ID and is received on at least one symbol of the symbols, the at least one symbol being identified by the respective resource ID;
determining timing information associated with the received set of sequences; and
broadcasting a second set of information in a third subset of the set of resources, the second set of information comprising the determined timing information, a position associated with the UE, and identifiers of the plurality of UEs.

23. The non-transitory computer-readable medium of claim 22, wherein the set of sequences include Zadoff Chu sequences, and the respective sequence ID comprises a root index and a cyclic shift associated with a Zadoff Chu sequence.

24. The non-transitory computer-readable medium of claim 22, wherein each sequence of the set of sequences occupies an entire bandwidth of the at least one symbol.

25. The non-transitory computer-readable medium of claim 22, further comprising instructions for receiving a message from a base station that indicates the first, second, and third subsets of the set of resources.

26. The non-transitory computer-readable medium of claim 22, further comprising instructions for determining at least one resource for broadcasting the second set of information in the third subset of the set of resources.

27. The non-transitory computer-readable medium of claim 26, wherein the determination is based on a random selection or an energy-based detection.

28. The non-transitory computer-readable medium of claim 26, further comprising instructions for receiving a message from a base station that indicates the at least one resource for broadcasting the second set of information, wherein the determination of the at least one resource is based on the received message.

* * * * *